United States Patent
Xie et al.

(10) Patent No.: US 12,170,618 B2
(45) Date of Patent: Dec. 17, 2024

(54) PACKET SENDING METHOD, DEVICE AND SYSTEM

(71) Applicant: Huawei Technologies Co., Ltd., Shenzhen (CN)

(72) Inventors: Jingrong Xie, Beijing (CN); Zhenbin Li, Beijing (CN); Gang Yan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 17/849,113

(22) Filed: Jun. 24, 2022

(65) Prior Publication Data

US 2022/0337521 A1 Oct. 20, 2022

Related U.S. Application Data

(63) Continuation of application No. PCT/CN2020/118611, filed on Sep. 29, 2020.

(30) Foreign Application Priority Data

Dec. 25, 2019 (CN) .......................... 201911356936.7
Apr. 30, 2020 (CN) .......................... 202010363531.2

(51) Int. Cl.
*H04L 45/74* (2022.01)
*H04L 12/46* (2006.01)
(Continued)

(52) U.S. Cl.
CPC .......... *H04L 45/76* (2022.05); *H04L 12/4633* (2013.01); *H04L 45/24* (2013.01); *H04L 45/74* (2013.01)

(58) Field of Classification Search
CPC ..... H04L 45/76; H04L 12/4633; H04L 45/24; H04L 45/74
See application file for complete search history.

(56) References Cited

U.S. PATENT DOCUMENTS

| 2015/0078379 A1* | 3/2015 | Wijnands | ................ H04L 45/74 370/390 |
| 2015/0131658 A1* | 5/2015 | Wijnands | ............ H04L 45/7453 370/392 |
| 2015/0131660 A1* | 5/2015 | Shepherd | ................ H04L 45/74 370/390 |

(Continued)

FOREIGN PATENT DOCUMENTS

| CN | 105453513 A | 3/2016 |
| CN | 109218158 A | 1/2019 |

(Continued)

OTHER PUBLICATIONS

Deeriing, S. et al., "Internet Protocol, Version 6 (IPv6) Specification," Internet Engineering Task Force (IETF), Request for Comments: 8200, STD: 86, Obsoletes: 2460, Category: Standards Track, Jul. 2017, 42 pages.

(Continued)

*Primary Examiner* — Michael J Moore, Jr.
(74) *Attorney, Agent, or Firm* — Slater Matsil, LLP

(57) ABSTRACT

This application provides a packet sending method. The method includes: receiving, by a first network device, a data packet, and encapsulating the data packet to obtain a first packet, where the first packet includes an IPv6 header, a bit index explicit replication BIER header, and the data packet, and some bits of a source IPv6 address field in the IPv6 header include identification information of a first tenant; and sending, by the first network device, the first packet to a second network device, where the identification information of the first tenant is used by the second network device to determine to send the data packet to an interface, corresponding to the first tenant, of the second network device.

20 Claims, 7 Drawing Sheets

(51) Int. Cl.
*H04L 45/24* (2022.01)
*H04L 45/76* (2022.01)

(56) References Cited

U.S. PATENT DOCUMENTS

| | | | |
|---|---|---|---|
| 2016/0119159 A1* | 4/2016 | Zhao | H04L 47/15 370/390 |
| 2018/0131532 A1* | 5/2018 | Wijnands | H04L 12/1845 |
| 2018/0205636 A1* | 7/2018 | Hu | H04L 47/825 |
| 2018/0287935 A1* | 10/2018 | Wang | H04L 12/4625 |
| 2018/0316520 A1* | 11/2018 | Wijnands | H04L 45/50 |
| 2018/0367456 A1* | 12/2018 | Wijnands | H04L 12/1854 |
| 2019/0058606 A1 | 2/2019 | Wijnands et al. | |
| 2019/0068524 A1 | 2/2019 | Shepherd et al. | |
| 2019/0297000 A1* | 9/2019 | Dutta | H04L 45/16 |
| 2019/0386837 A1* | 12/2019 | Zhang | H04L 12/18 |
| 2019/0394059 A1* | 12/2019 | Zhang | H04L 45/16 |
| 2020/0112503 A1* | 4/2020 | Zhang | H04L 45/16 |
| 2020/0344162 A1* | 10/2020 | Dutta | H04L 47/724 |
| 2021/0058260 A1 | 2/2021 | Xia et al. | |
| 2022/0109623 A1* | 4/2022 | Xie | H04L 45/16 |
| 2023/0318966 A1* | 10/2023 | Duan | H04L 12/4633 370/392 |
| 2024/0275722 A1* | 8/2024 | Xie | H04L 45/74 |

FOREIGN PATENT DOCUMENTS

| | | | | |
|---|---|---|---|---|
| CN | 109246017 | A | | 1/2019 |
| CN | 109729012 | A | | 5/2019 |
| CN | 109756425 | A * | 5/2019 | |
| CN | 110460522 | A | | 11/2019 |
| CN | 111147383 | B | | 5/2020 |
| CN | 113595913 | A | | 11/2021 |
| JP | 2017229027 | A | | 12/2017 |
| WO | 2016188501 | A1 | | 12/2016 |
| WO | WO-2016198022 | A1 * | 12/2016 | ......... H04L 12/4645 |
| WO | 2018006671 | A1 | | 1/2018 |
| WO | 2019045993 | A1 | | 3/2019 |
| WO | 2019114437 | A1 | | 6/2019 |

OTHER PUBLICATIONS

Rabadan, J. et al., "Preference-based EVPN DF Election," draft-ietf-bess-evpn-pref-df-01, BESS Workgroup, Internet Draft, Intended Status: Standards Track, Apr. 9, 2018, 12 pages.

Wijnands, I.J. et al., "Encapsulation for Bit Index Explicit Replication (BIER) in MPLS and Non-MPLS Networks," Internet Engineering Task Force (IETF), Request for: Comments: 8296, Catagory: Experimental, Jan. 2018, 24 pages.

Xie, J. et al., "Encapsulation for BIER in Non-MPLS IPv6 Networks," draft-xie-bier-ipv6-encapsulation-00, Network Working Group, Internet-Draft, Intended Status: Standards Track, Expires: Sep. 9, 2019, Mar. 8, 2019, 12 pages.

Zhang, Z. et al., "EVPN BUM Using BIER," draft-ietf-bier-evpn-00, BIER, Internet-Draft, Intended Status: Standards Track, Expires: Feb. 16, 2018, Aug. 15, 2017, 12 pages.

* cited by examiner

PACKET SENDING METHOD, DEVICE AND SYSTEM

CROSS-REFERENCE TO RELATED APPLICATIONS

This application is a continuation of International Application No. PCT/CN2020/118611, filed on Sep. 29, 2020, which claims priority to Chinese Patent Application No. 201911356936.7, filed on Dec. 25, 2019 and claims priority to Chinese Patent Application No. 202010363531.2, filed on Apr. 30, 2020. All of the aforementioned patent applications are hereby incorporated by reference in their entireties.

TECHNICAL FIELD

This application relates to the field of network communications, and more specifically, to a packet sending method, a device, and a system.

BACKGROUND

An internet protocol (IP) multicast technology implements efficient point-to-multipoint data transmission on an IP network, thereby effectively saving network bandwidth and reducing network load. Recently, a new technology for constructing a multicast data forwarding path is proposed in the industry, which is referred to as a bit index explicit replication (BIER) technology. The technology proposes a new multicast technical architecture that does not require construction of a multicast distribution tree.

Bit index explicit replication version 6 (BIERv6) encapsulation may be applied to a multicast service. The multicast service may support a plurality of virtual private networks (VPN). In this scenario, a multicast source node of each VPN in the plurality of VPNs may allocate an IPv6 address to the VPN, and a node in the VPN needs to store a correspondence between a source IPv6 address and a VPN. Therefore, a plurality of nodes in a large quantity of VPNs need to store correspondences between source IPv6 addresses and VPNs, which causes a problem such as large memory overheads.

SUMMARY

This application provides a packet sending method, a first network device, a second network device, and a system, to reduce memory overheads, and avoid memory overhead waste.

According to a first aspect, a packet sending method is provided, including: a first network device receives a data packet, and encapsulates the data packet to obtain a first packet, where the first packet includes an internet protocol version 6 IPv6 header, a bit index explicit replication BIER header, and the data packet, and some bits of a source IPv6 address field in the IPv6 header include identification information of a first tenant; and the first network device sends the first packet to a second network device, where the identification information of the first tenant is used by the second network device to determine to send the data packet to an interface, corresponding to the first tenant, of the second network device.

A format of the BIER header is not specifically limited in this application, provided that a bit string field is included. In a possible format of the BIER header, a BIFT ID field is included, and the BIFT ID field is mapped to values of SD/BSL/SI. In another possible implementation, the BIER header directly includes SD/BSL/SI fields but does not include a BIFT ID field, and the BIFT ID field does not need to be mapped to values of SD/BSL/SI.

It should be understood that the BIER header may be included in an IPv6 extension header, and the IPv6 extension header may be a destination option header (DOH). For another example, the IPv6 extension header may be a routing header (HR). This is not specifically limited in this application.

The first network device may further add, based on configuration information, identification information of a tenant corresponding to the data packet into the source IPv6 address field in the IPv6 header.

It should be understood that the identification information of the tenant is not specifically limited in this embodiment of this application. For example, a tenant or a VPN instance may be represented by using a 24-bit virtual network identifier (VNI). For another example, a tenant or a VPN instance may be represented by using a 20-bit MPLS label value.

It should be noted that, when a tenant or a VPN instance is represented by using a 20-bit MPLS label value, and a data packet of the tenant is encapsulated by using BIER, an encapsulation manner of one set of {BIER header+MPLS label+data packet} is used. The MPLS label is a global label. To be specific, a plurality of TOR devices use a same MPLS label to identify a same tenant. A value 1 of a proto field in the BIER header is used to indicate that the BIER header is followed by the MPLS label. This embodiment of this application may also be applicable to a case in which an MPLS global label is used. An MPLS global label representing a tenant is embedded in an IPv6 source address.

After receiving the first packet, the second network device may determine, based on a forwarding entry created on the second network device and the bit string in the BIER header of the first packet, that the first packet is sent to the second network device. After decapsulating the first packet, the second network device forwards the inner data packet.

In this embodiment of this application, before decapsulating the first packet, the second network device needs to obtain the identification information of the first tenant from the source IPv6 address field in the outer IPv6 header. In addition, after the first packet is decapsulated, the inner data packet is sent based on the obtained identification information of the first tenant to the interface corresponding to the first tenant.

In the foregoing technical solutions, the identification information of the tenant is embedded in an IPv6 source address of a BIER IPv6 packet, so that when determining tenant information of the packet, a network device receiving the packet needs only to read the IPv6 source address based on indication information to obtain identification information of a specific tenant. The network device receiving the packet does not need to obtain corresponding tenant information based on the entire IPv6 source address, and does not need to store an N:1 mapping relationship between IPv6 addresses and identification information of a tenant, so as to reduce memory overheads, and avoid a problem such as memory overhead waste.

In a possible implementation, 24 bits of the source IPv6 address field are used to identify the identification information of the first tenant.

In another possible implementation, the data packet may be a unicast packet, or may be a multicast packet, or may be a broadcast packet. This is not specifically limited in this application.

In another possible implementation, the identification information of the first tenant is a virtual network identifier VNI or a multiprotocol label switching MPLS label value.

It should be understood that the identification information of the first tenant is, for example, the 24-bit VNI, and the identification information of the first tenant is embedded in the 24 bits of the source IPv6 address. The 24-bit VNI may be embedded in any position in the 128-bit source IPv6 address field. This is not specifically limited in this application. For example, the 24-bit VNI may be embedded in the last 24 bits (the $105^{th}$ bit to the $128^{th}$ bit) of the 128-bit source IPv6 address field. For another example, the 24-bit VNI may be embedded in the $97^{th}$ bit to the $120^{th}$ bit of the 128-bit source IPv6 address field.

In another possible implementation, the first packet indicates that the source IPv6 address field includes the identification information of the first tenant.

In another possible implementation, that the source IPv6 address field in the first packet includes the identification information of the first tenant may be indicated in a system default manner.

In another possible implementation, alternatively, the BIER header of the first packet may include a second identifier, and the second identifier is used to indicate that the first packet includes the identification information of the first tenant.

In another possible implementation, a field used to identify the second identifier is a proto field or a bit index forwarding table identifier BIFT ID field.

In another possible implementation, before the encapsulating, by the first network device, the data packet to obtain a first packet, the method further includes: the first network device determines the identification information of the first tenant.

In another possible implementation, the first network device determines that an interface for receiving the data packet is an interface of the first tenant, and the first network device determines the identification information of the first tenant based on the interface of the first tenant.

According to a second aspect, a packet sending method is provided, including: a second network device receives a first packet, where the first packet includes an internet protocol version 6 IPv6 header, a bit index explicit replication BIER header, and a data packet, and some bits of a source IPv6 address field in the IPv6 header include identification information of a first tenant; the second network device obtains the identification information of the first tenant from the source IPv6 address field; the second network device decapsulates the first packet to obtain the data packet; and the second network device sends, based on the identification information of the first tenant, the data packet to an interface corresponding to the first tenant.

A format of the BIER header is not specifically limited in this application, provided that a bit string field is included. In a possible format of the BIER header, a BIFT ID field is included, and the BIFT ID field is mapped to values of SD/BSL/SI. In another possible implementation, the BIER header directly includes SD/BSL/SI fields but does not include a BIFT ID field, and the BIFT ID field does not need to be mapped to values of SD/BSL/SI.

In a possible implementation, before the second network device obtains the identification information of the first tenant from the source IPv6 address field, the method further includes: the second network device determines, based on a second identifier included in the BIER header, that the source IPv6 address field includes the identification information of the first tenant.

In another possible implementation, a field used to identify the second identifier is a proto field or a bit index forwarding table identifier BIFT ID field.

In another possible implementation, the identification information of the first tenant is a virtual network identifier VNI or a multiprotocol label switching MPLS label value.

In another possible implementation, the data packet may be a unicast packet, or may be a multicast packet, or may be a broadcast packet. This is not specifically limited in this application.

In another possible implementation, 24 bits of the source IPv6 address field are used to identify the identification information of the first tenant.

It should be understood that the identification information of the first tenant is, for example, the 24-bit VNI, and the identification information of the first tenant is embedded in the 24 bits of the source IPv6 address. The 24-bit VNI may be embedded in any position in the 128-bit source IPv6 address field. This is not specifically limited in this application. For example, the 24-bit VNI may be embedded in the last 24 bits (the $105^{th}$ bit to the $128^{th}$ bit) of the 128-bit source IPv6 address field. For another example, the 24-bit VNI may be embedded in the $97^{th}$ bit to the $120^{th}$ bit of the 128-bit source IPv6 address field.

Beneficial effects of the second aspect and any possible implementation of the second aspect correspond to beneficial effects of the first aspect and any possible implementation of the first aspect, and details are not described herein again.

According to a third aspect, a first network device is provided, including a receiving module, an encapsulation module, and a sending module.

The receiving module is configured to receive a data packet. The encapsulation module is configured to encapsulate the data packet to obtain a first packet, where the first packet includes an internet protocol version 6 IPv6 header, a bit index explicit replication BIER header, and the data packet, and some bits of a source IPv6 address field in the IPv6 header include identification information of a first tenant. The sending module is configured to send the first packet to a second network device. The identification information of the first tenant is used by the second network device to determine to send the data packet to an interface, corresponding to the first tenant, of the second network device.

In a possible implementation, the first packet includes a second identifier, and the second identifier is used to indicate that the first packet includes the identification information of the first tenant.

In another possible implementation, a field used to identify the second identifier is a proto field or a bit index forwarding table identifier BIFT ID field.

In another possible implementation, the first network device further includes a determining module, configured to determine the identification information of the first tenant.

In another possible implementation, the determining module is specifically configured to: determine that an interface for receiving the data packet is an interface of the first tenant; and determine the identification information of the first tenant based on that the interface of the data packet is the interface of the first tenant.

In another possible implementation, the identification information of the first tenant is a virtual network identifier VNI or a multiprotocol label switching MPLS label value.

In another possible implementation, the data packet is a unicast packet, a multicast packet, or a broadcast packet.

In another possible implementation, 24 bits of the source IPv6 address field are used to identify the identification information of the first tenant.

According to a fourth aspect, a second network device is provided, including a receiving module, a decapsulation module, and a sending module.

The receiving module is configured to receive a first packet, where the first packet includes an internet protocol version 6 IPv6 header, a bit index explicit replication BIER header, and a data packet, and some bits of a source IPv6 address field in the IPv6 header include identification information of a first tenant.

The decapsulation module is configured to decapsulate the first packet to obtain the data packet.

The sending module is configured to send, based on the identification information of the first tenant, the data packet to an interface corresponding to the first tenant.

In a possible implementation, the second network device further includes a determining module, configured to determine, based on a second identifier included in the BIER header, that the first packet includes the identification information of the first tenant.

In another possible implementation, a field used to identify the second identifier is a proto field or a bit index forwarding table identifier BIFT ID field.

In another possible implementation, the identification information of the first tenant is a virtual network identifier VNI or a multiprotocol label switching MPLS label value.

In another possible implementation, the data packet is a unicast packet, a multicast packet, or a broadcast packet.

In another possible implementation, 24 bits of the source IPv6 address field are used to identify the identification information of the first tenant. To be specific, some bits of the source IPv6 address field include the identification information of the first tenant, and the some bits of the source IPv6 address field are 24 bits of the source IPv6 address field.

According to a fifth aspect, a first network device is provided. The first network device includes a processor, a memory, an interface, and a bus. The interface may be implemented in a wireless or wired manner, and may be specifically a network adapter. The processor, the memory, and the interface are connected through the bus.

The interface may specifically include a transmitter and a receiver, and is used by the first network device to implement the foregoing receiving and sending. For example, this interface is configured to support receiving of a data packet. For another example, the interface is configured to support sending of a first packet to a second network device.

The processor is configured to perform processing performed by the first network device in the foregoing embodiments. For example, the processor is configured to encapsulate the data packet to obtain the first packet, and/or perform other processes of technologies described in this specification. The memory includes an operating system and an application program, and is configured to store a program, code, or instructions. When executing the program, the code, or the instructions, the processor or a hardware device may complete a processing process of the first network device in the method embodiments. Optionally, the memory may include a read-only memory (ROM) and a random access memory (RAM). The ROM includes a basic input/output system BIOS) or an embedded system. The RAM includes an application program and an operating system. When the first network device needs to run, a bootloader in the BIOS or the embedded system that is built into the ROM is used to boot a system to start, and boot the first network device to enter a normal running state. After entering the normal running state, the first network device runs the application program and the operating system in the RAM, to implement a processing process related to the first network device in the method embodiment in the first aspect and any possible implementation.

It may be understood that, in actual application, the first network device may include any quantity of interfaces, processors, or memories.

According to a sixth aspect, a second network device is provided. The second network device includes a processor, a memory, an interface, and a bus. The interface may be implemented in a wireless or wired manner, and may be specifically a network adapter. The processor, the memory, and the interface are connected through the bus.

The interface may specifically include a transmitter and a receiver, and is used by the second network device to implement the foregoing receiving and sending. For example, the interface is configured to support receiving of a first packet sent by a first network device. For another example, the interface is configured to support sending of a data packet, based on identification information of a first tenant, to an interface corresponding to the first tenant. For example, the data packet may be sent to a bridge domain of the first tenant.

The processor is configured to perform processing performed by the second network device in the foregoing embodiments. For example, the processor is configured to obtain the identification information of the first tenant from a source IPv6 address field, and is configured to decapsulate the first packet to obtain the data packet, and/or perform other processes of technologies described in this specification. The memory includes an operating system and an application, and is configured to store a program, code, or instructions. When executing the program, the code, or the instructions, the processor or a hardware device may complete a processing process of the second network device in the method embodiments. Optionally, the memory may include a read-only memory (ROM) and a random access memory (RAM). The ROM includes a basic input/output system (BIOS) or an embedded system. The RAM includes an application program and an operating system. When the second network device needs to run, a bootloader in the BIOS or the embedded system that is built into the ROM is used to boot a system to start, and boot the second network device to enter a normal running state. After entering the normal running state, the second network device runs the application program and the operating system in the RAM, to implement a processing process related to the second network device in the method embodiment in the second aspect and any possible implementation.

It may be understood that, in actual application, the second network device may include any quantity of interfaces, processors, or memories.

According to a seventh aspect, a computer program product is provided. The computer program product includes computer program code, and when the computer program code is run on a computer, the computer is enabled to perform the method performed in the first aspect or any possible implementation of the first aspect.

According to an eighth aspect, a computer program product is provided. The computer program product includes computer program code, and when the computer program code is run on a computer, the computer is enabled to perform the method performed in the second aspect or any possible implementation of the second aspect.

According to a ninth aspect, a computer-readable medium is provided. The computer-readable medium stores program code, and when the computer program code is run on a computer, the computer is enabled to perform the method performed in the first aspect or any possible implementation of the first aspect. The computer-readable storage includes but is not limited to one or more of the following: a read-only memory (ROM), a programmable ROM (PROM), an erasable PROM (EPROM), a flash memory, an electrically EPROM (EEPROM), and a hard drive.

According to a tenth aspect, a computer-readable medium is provided. The computer-readable medium stores program code, and when the computer program code is run on a computer, the computer is enabled to perform the method performed in the second aspect or any possible implementation of the second aspect. The computer-readable storage includes but is not limited to one or more of the following: a read-only memory (ROM), a programmable ROM (PROM), an erasable PROM (EPROM), a flash memory, an electrically EPROM (EEPROM), and a hard drive.

According to an eleventh aspect, a chip is provided. The chip includes a processor and a data interface, and the processor reads, through the data interface, instructions stored in a memory to perform the method according to any one of the first aspect or the possible implementations of the first aspect. In a specific implementation process, the chip may be implemented in a form of a central processing unit (CPU), a micro controller (MCU), a microprocessing unit (MPU), a digital signal processor (DSP), a system-on-a-chip (SoC), an application-specific integrated circuit (ASIC), a field programmable gate array (FPGA), or a programmable logic device (PLD).

According to a twelfth aspect, a chip is provided. The chip includes a processor and a data interface, and the processor reads, through the data interface, instructions stored in a memory to perform the method according to any one of the second aspect or the possible implementations of the second aspect. In a specific implementation process, the chip may be implemented in a form of a central processing unit (CPU), a micro controller (MCU), a microprocessing unit (MPU), a digital signal processor (DSP), a system-on-a-chip (SoC), an application-specific integrated circuit (ASIC), a field programmable gate array (FPGA), or a programmable logic device (PLD).

According to a thirteenth aspect, a system is provided. The system includes the first network device according to any one of the third aspect or the possible implementations and the second network device according to any one of the fourth aspect or the possible implementations.

DETAILED DESCRIPTION OF ILLUSTRATIVE EMBODIMENTS

Figure 1:
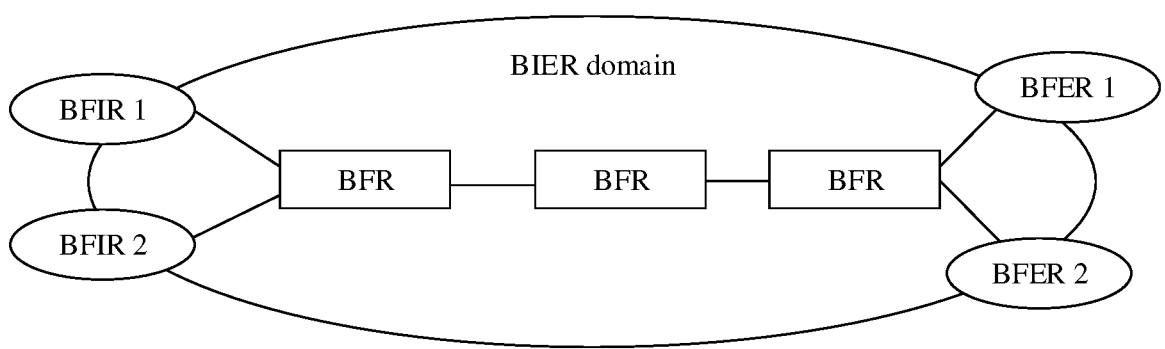
FIG. 1 is a schematic networking diagram of a BIER technology according to an embodiment of this application.

The following describes technical solutions of this application with reference to the accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example", "such as" in the embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In the embodiments of this application, "corresponding (relevant)", and "corresponding" sometimes may be used in a mixed manner. It should be noted that when a difference is not emphasized, meanings to be expressed by them are the same.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that, with evolution of the network architecture and emergence of a new service scenario, the technical solutions provided in the embodiments of this application are also applicable to a similar technical problem.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments", that appear at different places in this specification do not necessarily mean referring to a same embodiment, instead, they mean "one or more but not all of the embodiments", unless otherwise specifically emphasized. The terms "include", "contain", "have", and their variants all mean "include but are not limited to", unless otherwise specifically emphasized.

In this application, "at least one" means one or more, and "a plurality of" means two or more. The term "and/or" describes an association relationship for describing associated objects and represents that three relationships may exist. For example, A and/or B may indicate a case in which only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

Multicast is a data transmission mode in which data is efficiently sent to a plurality of receivers in a transmission control protocol (TCP)/internet protocol (IP) network at a same time by using one multicast address. A multicast source sends multicast traffic to a multicast group member in a multicast group through a link in a network, and each multicast group member in the multicast group can receive the multicast traffic. A multicast transmission mode implements a point-to-multipoint data connection between the multicast source and the multicast group members. The multicast traffic needs to be transmitted only once on each network link, and the multicast is replicated only when there is a branch on the link. Therefore, the multicast transmission mode improves data transmission efficiency and reduces a possibility of congestion on a backbone network.

An internet protocol (IP) multicast technology implements efficient point-to-multipoint data transmission on an IP network, thereby effectively saving network bandwidth and reducing network load. Therefore, the internet protocol multicast technology is widely used in real-time data transmission, multimedia conferencing, data copy, internet protocol television (IPTV), games, simulation, and the like. In the multicast technology, a multicast tree is constructed on a control plane by using a multicast protocol, and then a network plane is made to be logically tree-shaped by using the multicast tree, to implement multicast point-to-multipoint data forwarding. Each intermediate node with a core of constructing a distribution tree needs to maintain a complex multicast forwarding information state. As a network scale is increasingly large and multicast data traffic increases over time, this multicast technology faces an increasingly large challenge in terms of costs and operation and maintenance.

Therefore, a new technology for constructing a multicast data forwarding path is proposed in the industry, which is referred to as a bit index explicit replication (BIER) technology. The technology proposes a multicast technology architecture in which a multicast distribution tree does not need to be constructed. As shown in FIG. 1, a router supporting the BIER technology is referred to as a bit-forwarding router (BFR), and the BFR can receive and forward a BIER packet. A multicast forwarding domain including one or more BFRs is referred to as a BIER domain. At an ingress of the BIER domain, a BFR that performs BIER encapsulation on an original multicast data packet is referred to as a bit-forwarding ingress router (BFIR). At an egress of the BIER domain, a BFR that obtains an original multicast data packet from the BIER packet through decapsulation is referred to as a bit-forwarding egress router (BFER). It should be understood that the BFIR and the BFER in the BIER domain may be referred to as edge BFRs in the BIER domain.

Figure 2:
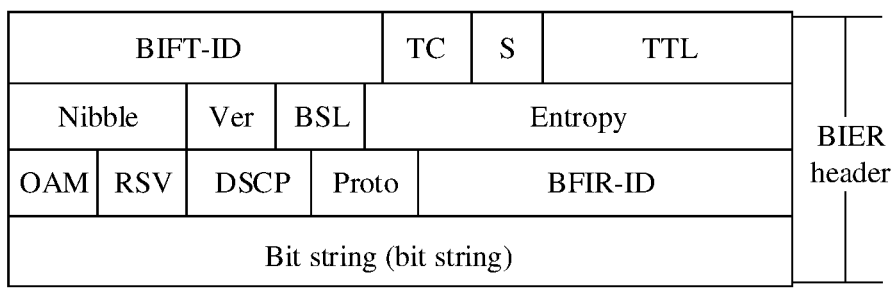
FIG. 2 is a schematic diagram of a possible form of a BIER header according to an embodiment of this application.
Figure 3:
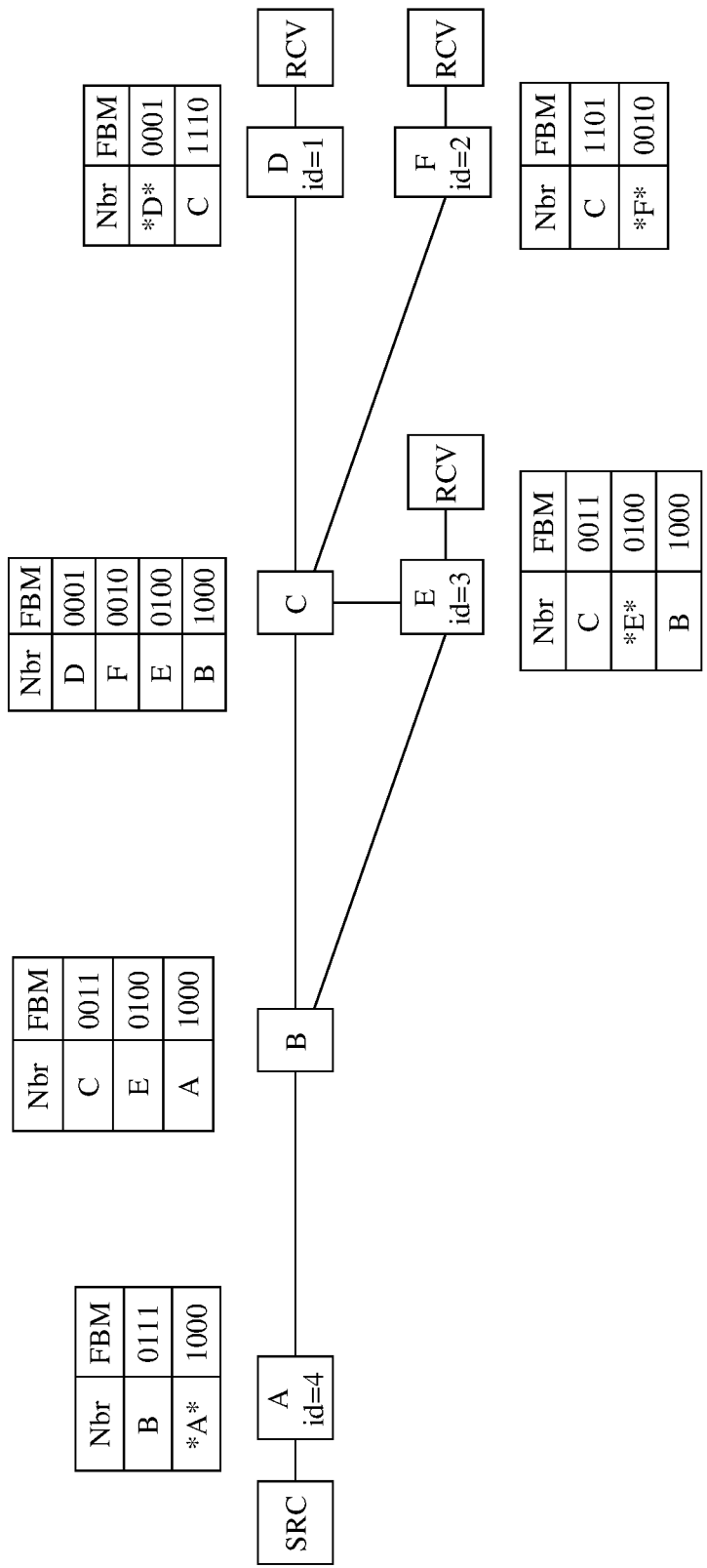
FIG. 3 is a process of creating a BIER forwarding table based on a BIER technology and forwarding a BIER packet based on the BIER technology.
Figure 4:
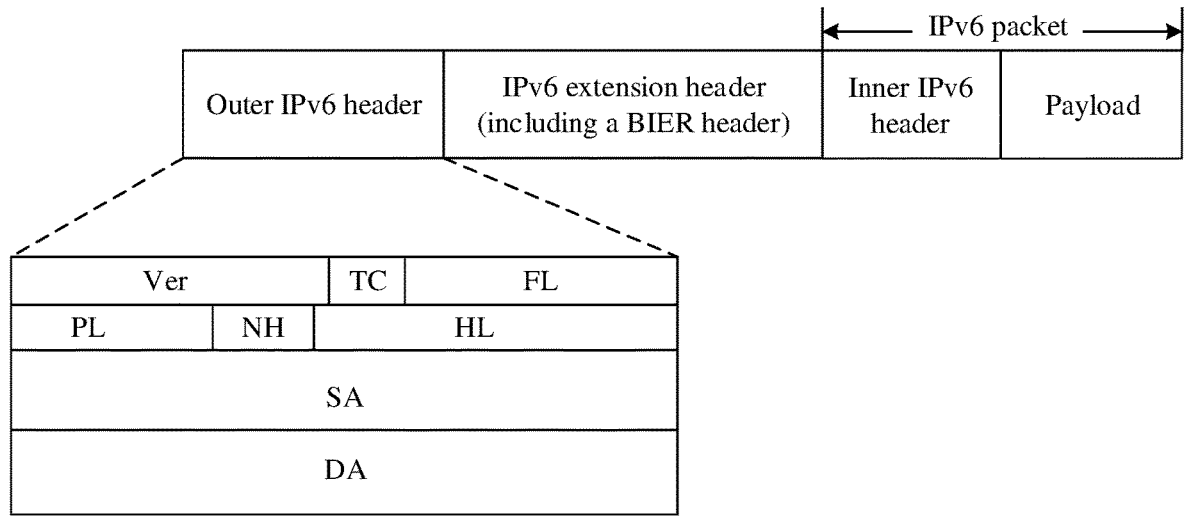
FIG. 4 is a schematic diagram of a packet format using BIERv6 encapsulation according to an embodiment of this application.

For ease of understanding, the following describes the BIER technology in detail with reference to FIG. 2 to FIG. 4.

In the BIER domain, a globally unique bit position identifier may be configured for the edge BFR in an entire BIER sub-domain (SD). In an example, a value is configured for each edge BFR as a BFR identifier (BFR ID). For example, the BFR ID may be a value ranging from 1 to 256. All BFR IDs in the BIER domain form a bit string.

For example, a possible format of the BIER packet is: a BIER header+an original multicast data packet. Specifically, when the original multicast data packet is transmitted in the BIER domain, a specific BIER header needs to be additionally encapsulated. In the BIER header, all destination nodes of the original multicast data packet are indicated by the bit string. The BFR in the BIER domain may perform forwarding based on a bit index forwarding table (BIFT) and the bit string that is carried in the BIER header, to ensure that the original multicast packet can be sent to all the destination addresses.

It should be noted that the destination nodes of the original multicast data packet in this application may be a set of a plurality of BFERs. For ease of description, the set of the plurality of BFERs to which the original multicast data packet needs to be sent is referred to as the destination nodes below.

It should be understood that the original multicast data packet following the BIER header may be an internet protocol version 6 (IPv6) multicast packet, or may be an internet protocol version 4 (IPv4) multicast packet.

FIG. 2 is a schematic block diagram of a possible format of a BIER header. As shown in FIG. 2, the BIER header may include but is not limited to: a bit index forwarding table identifier (BIFT ID) with a length of 20 bits, a bit string length (BSL), and other fields of 64 bits (8 bytes): for example, traffic class (TC), stack (S), time to live (TTL), entropy, version (Ver) fields of an original multicast data packet that follow the BIER header. The fields in the BIER header are separately described below in detail.

(1) BIFT ID Field

The BIFT ID field has a length of 20 bits, and is an MPLS label (L) in BIER-multiprotocol label switching (MPLS) encapsulation. The MPLS label may be referred to as a BIER label. Fields such as the TC/S/TTL following the BIER label are in a standard label coding format. The fields such as TC/S/TTL are separately described below, and details are not described herein.

A BIFT ID may be a BIFT-id, and may include a combination of a sub-domain (SD)/a bit string length (BSL)/a set identifier (SI). Different BIFT IDs may correspond to different SD/BSL/SI combinations.

1. Sub-Domain (SD)

One BIER domain may be divided and configured into different sub-domains (SDs) based on a requirement of an actual service scenario, to support a multi-topology feature and the like of an interior gateway protocol (IGP). Each BIER domain needs to include at least one sub-domain, namely, a default sub-domain 0. When a plurality of sub-domains are obtained through division, all the sub-domains need to be configured for each BFR router in the BIER domain. For example, one sub-domain 0 may be configured on each BFR router in the BIER domain and a system default topology is used. Then, one sub-domain 1 may be configured and a multicast topology is used.

Each sub-domain SD is represented by a sub-domain identifier (SD-ID). For example, a value of the SD-ID is [0-255], and a length of the SD-ID is 8 bits. In an example, for different virtual private networks (VPN), the BIER domain is configured into different SDs, and different VPNs are configured to use different SDs. For example, a VPN 1 uses the SD 0, and a VPN 2 uses the SD 1.

It should be noted that a plurality of VPNs may alternatively use a same SD. Different SDs in the BIER domain may be in one interior gateway protocol (IGP) process or topology, or may not be in one IGP process or topology. This is not specifically limited in this embodiment of this application.

2. Bit String Length (BSL)

The BSL is a length of a bit string included in the BIER header. The BSL may be in various types. This is not specifically limited in this embodiment of this application. A smallest BSL has 64 bits, the BSL may further sequentially have 128 bits, 256 bits, 512 bits, 1024 bits, and 2048 bits, and a largest BSL has 4096 bits. Specifically, the BSL is identified in a packet by 4 bits. For example, when the BSL has 64 bits, the BSL is identified in the packet by 0001; when the BSL has 128 bits, the BSL is identified in the packet by 0010; when the BSL has 512 bits, the BSL is identified in the packet by 1000; when the BSL has 1024 bits, the BSL is identified in the packet by 0101, and so on.

3. Set Identifier (SI)

If a quantity of BFER nodes in a network is greater than 256, to adapt to this situation, BIER encapsulation not only includes one bit string, but also includes one set identifier (SI). The SI is used to divide BIER node numbers into different ranges to support larger-scale network addressing.

The SI may be understood as a set including a plurality of edge BFRs in a network or including configured BFR IDs. In an example, the BSL has 256 bits, but there are more than 256 edge BFRs in a network, or there are more than 256 configured BFR IDs. In this case, these edge BFRs or BFR IDs need to be divided into different sets. For example, the BSL is 256 as an example, 256 edge BFRs with BFR IDs from 1 to 256 belong to a set 0 (set index 0, or SI=0); 256 edge BFRs with BFR IDs from 257 to 512 belong to a set 1 (set index 1, or SI=1).

After receiving a BIER packet, the BFR in the BIER domain may determine, based on a BIFT ID in the BIER header, a specific SD to which the BIER packet belongs, a used BSL, and a set of a specific SI of the BSL to which the packet belongs.

Corresponding SD/BSL/SI combinations represented by several possible BIFT IDs are enumerated below:
  BIFT ID=1: corresponding to SD 0, BSL 256, SI 0//equivalent to SD 0/BSL 256/SI 0
  BIFT ID=2: corresponding to SD 0, BSL 256, SI 1//equivalent to SD 0/BSL 256/SI 1
  BIFT ID=3: corresponding to SD 0, BSL 256, SI 2//equivalent to SD 0/BSL 256/SI 2
  BIFT ID=4: corresponding to SD 0, BSL 256, SI 3//equivalent to SD 0/BSL 256/SI 3
  BIFT ID=5: corresponding to SD 0, BSL 512, SI 0//equivalent to SD 0/BSL 512/SI 0
  BIFT ID=6: corresponding to SD 0, BSL 512, SI 1//equivalent to SD 0/BSL 512/SI 1
  BIFT ID=7: corresponding to SD 1, BSL 256, SI 0//equivalent to SD 1/BSL 256/SI 0
  BIFT ID=8: corresponding to SD 1, BSL 256, SI 1//equivalent to SD 1/BSL 256/SI 1
  BIFT ID=9: corresponding to SD 1, BSL 256, SI 2//equivalent to SD 1/BSL 256/SI 2
  BIFT ID=10: corresponding to SD 1, BSL 256, SI 3//equivalent to SD 1/BSL 256/SI 3
  BIFT ID=11: corresponding to SD 1, BSL 512, SI 0//equivalent to SD 1/BSL 512/SI 0
  BIFT ID=12: corresponding to SD 1, BSL 512, SI 1//equivalent to SD 1/BSL 512/SI 1

It should be noted that a value of the BIFT ID field corresponds to a triplet <SD, BSL, SI>. Unique <SD, BSL, SI> information can be obtained by using the BIFT-id field. The <SD, BSL, SI> information has the following functions: A length of a bit string in a BIER packet header is obtained by using the BSL, to know a length of the entire BIER packet header. Whether the bit string represents BFR-IDs ranging from 1 to 256 or ranging from 257 to 512 can be learned by using the BSL and SI information. A corresponding forwarding table can be found by using the SD information.

(2) Bit String Field

Each bit in a bit string is used to identify an edge BFR, for example, a bit in a lower position (rightmost) in the bit string is used to identify a BFER whose BFR ID is equal to 1. A second bit from the right to the left in the bit string identifies a BFER whose BFR ID is equal to 2. A forwarding entry based on which a forwarding plane performs forwarding determines, based on a bit string in a packet, several specific BFERs to which the packet is to be sent. When receiving a packet header including BIER, the BFR in the BIER domain forwards the BIER packet based on a bit string and a BIFT ID that are carried in the BIER header.

It should be noted that, if a value of a bit is 1, it represents that the packet needs to be sent to a BFER node represented by the BFR ID, or if a value of a bit is 0, it represents that the packet does not need to be sent to a BFER node represented by the BFR ID.

For example, BIFT ID=2. After receiving the BIER packet, the BFR may learn, based on the BIFT ID in the BIER header, that the BIER packet belongs to the SD 0, and a BSL used in the BIER header has 256 bits, and the BFR ID belongs to the set 1 (a set including 256 edge BFRs whose BFR IDs ranges from 257 to 512).

(3) Traffic Class (TC) Field

The traffic class field is used to identify a priority of a packet.

(4) Stack (S)

S is a bottommost label. A value of the label is 1 in the BIER packet header. In other words, the MPLS label is a bottommost label of an entire label stack.

(5) Version Number (Ver) Field

The version number field has a length of 4 bits, and is a version number of the IP. A value 4 of the version number field represents IPv4, and a value 6 of the version number field represents IPv6.

(6) Entropy Field

Entropies of a plurality of packets belonging to same traffic are the same, and entropies of a plurality of packets belonging to different traffic are different. When a packet is forwarded, different traffic may be shared on different links based on entropy, and a plurality of packets having same traffic go through a same link.

(7) Proto Field

The proto field is used to identify a payload format following the BIER header. For example, values 4 and 6 respectively represent an IPv4 packet and an IPv6 packet. The value 2 represents an MPLS packet with an upstream-assigned label, and is a proto value used in an MVPN over BIER. A reason for using an upstream label is as follows: Multicast means sending in a point-to-multipoint manner. A sender site PE can allocate a unique label and send it to a receiver site PE through a control plane. A data packet uses a label allocated by the sender site PE and is identified at the receiver site PE. For the receiver site PE, the label is allocated by the sender site PE rather than the receiver site PE, and is referred to as an upstream label.

(8) Nibber

The nibble field has a fixed 4-bit value 0101. This field is used to distinguish between services carried by MPLS, and distinguish between BIER, IPv4, and IPv6. Because in MPLS encapsulation and forwarding, an IPv4 or IPv6 header after a label stack is sometimes checked to support an ECMP.

(9) BFIR-id

The BFIR-id is a BFR ID of a BFIR. A BFIR node uses a sub-domain to encapsulate and send a BIER packet, and the BFIR-id field is used to write a BFR ID of the node in the sub-domain.

(10) Bit String

The bit string field is a character string of a destination node set of a BIER packet.

It should be noted that a format of the BIER header is not specifically limited in this embodiment of this application, provided that the BIER header includes the bit string field. The format of the BIER header may be a format shown in FIG. 2, or may be another format. For example, in another possible implementation, the BIER header directly includes the SD/BSL/SI fields but does not include the BIFT ID field in FIG. 2, and the BIFT ID field does not need to be mapped to values of SD/BSL/SI.

With reference to FIG. 3, the following describes in detail a process of creating a BIER forwarding table based on the BIER technology and forwarding a BIER packet.

A BIER domain shown in FIG. 3 may include a node A to a node F. The node A, the node D, the node E, and the node F are edge BFRs in the BIER domain, and the node B and the node C are BIER intermediate forwarding nodes. Specifically, the node A is located at an ingress of the BIER domain, and is responsible for performing BIER encapsulation on an original multicast data packet. The node A corresponds to the BFIR in FIG. 1. The node D, the node E, and the node F are located at an egress of the BIER domain, and are responsible for performing decapsulation to obtain the original multicast data packet from the BIER packet. The node D, the node E, and the node F correspond to the BFIR in FIG. 1.

In this embodiment of this application, a unique BFR ID may be allocated to each edge BFR in the BIER domain. For example, in FIG. 3, BFR-IDs configured for the node A, the node D, the node E, and the node F are respectively 4, 1, 3, and 2. BFR-IDs are not allocated to BFRs that perform intermediate forwarding, such as, the node B and the node C.

A bit string encapsulated in a BIER header of data traffic indicates all destination nodes of the traffic. For example, a bit string corresponding to a node D whose BFR ID is 1 is 0001. A bit string corresponding to a node F whose BFR ID is 2 is 0010. A bit string corresponding to a node E whose BFR ID is 3 is 1000. A bit string corresponding to a node A whose BFR ID is 4 is 1000.

It should be understood that a BFR ID value allocated to each edge BFR in the BIER domain may be flooded to another BFR in the BIER domain by using a routing protocol. Flooded BIER information further includes an IP address and encapsulation information of the edge BFR. For example, flooded BIER information of the node A carries an IP address and a BIFT-id of the node A. The BFR (for example, the node F in FIG. 3) in the BIER domain may create a BIFT entry based on the flooded BIER information, so that after the node F in FIG. 3 receives the BIER packet, the BIER packet is forwarded to a destination node based on the created BIFT entry.

For the node A, if the BIER packet needs to be sent to BFERs whose BFR IDs are respectively 1, 2, and 3, the BIER packet needs to be first sent to a neighbor (the node B) of the node A, and an edge BFR whose BFR ID is 4 is the node A itself. Therefore, a BIFT entry created by the node A is shown as follows:

forwarding entry 1: neighbor (Nbr)=B, and forwarding bit mask (FBM)=0111; and forwarding entry 2: Nbr*=A, and FBM=1000.

The forwarding entry 1 is used to indicate that when any one of the first bit, the second bit, or the third bit, from right to left, of a bit string of the BIER packet is 1, the BIER packet is sent to the neighbor (the node B) of the node A. The forwarding entry 2 is used to indicate that when the fourth bit, from right to left, of a bit string of the BIER packet is 1, the BIER packet is sent to the node A. Because the BIER packet is sent to the node A itself, the node A strips the BIER header, and performs forwarding based on information in the original multicast data packet.

It should be noted that, in the forwarding entry, * is used to indicate that Nbr is the node A itself. Similarly, another node in FIG. 3 may also create a BIFT entry based on a neighboring node of the another node itself. For the BIFT entry created by the another node, refer to FIG. 3. Details are not described herein again.

After receiving the original multicast data packet, the node A serving as the BFIR at the ingress of the BIER domain encapsulates the BIER header before the original multicast data packet. It should be understood that, for ease of description, the node A serving as the BFIR at the ingress of the BIER domain is referred to as an ingress node A for short. As an example, after receiving the original multicast data packet, the ingress node A may learn of a destination node of the original multicast data packet based on a BFR ID flooded by using a border gateway protocol BGP message. For example, a receiver of the original multicast data packet is a destination node E whose BFR ID is 3, a destination node F whose BFR ID is 2, and a destination node D whose BFR ID is 1. The ingress node A encapsulates a BIER packet with the BIER header in which the bit string is 0111, and forwards the encapsulated BIER packet to the neighboring node B based on the forwarding entry 1. After receiving the BIER packet, the node B determines, based on the bit string 0111 and the BIFT entry, that the BIER packet needs to be separately sent to the node C and the node E. When sending the BIER packet to the node C, the node B may perform an AND operation on the bit string (0111) in the BIER header and an FBM field corresponding to Nbr=C in the BIFT entry. In this embodiment of this application, an AND operation result is 0011. Therefore, the node B may change the bit string in the BIER header to 0011, and send the bit string to the node C. Similarly, when sending the BIER packet to the node E, the node B may modify the bit string in the BIER header to 0100. After receiving the BIER packet, the node E determines, based on the bit string 1000, that the BIER packet is to be sent to a neighboring node E. Because the node E determines that the neighboring node E is the node E itself based on an identifier * in the forwarding table, the node E serving as an egress BFER in the BIER domain may perform decapsulation to obtain the original multicast data packet from the BIER packet, and perform forwarding based on information in an inner original multicast data packet.

In BIER-MPLS encapsulation, the first 32 bits of the BIER header is an MPLS label code, and the first 20 bits of the first 32 bits is an MPLS label value. The MPLS label value changes in a forwarding process. For example, when the ingress node A sends a packet to the node B, an MPLS label value of the node B needs to be encapsulated. When the node B sends a packet to the node C, an MPLS label value of the node C needs to be encapsulated. In this embodiment of this application, MPLS label values allocated by the node A/the node B/the node C/the node D/the node E/the node F are respectively 100/200/300/400/500/600, and these MPLS label values need to be carried in the BIER encapsulation information and flooded to the another BFR in the BIER domain according to the routing protocol, so that the node A can learn of the MPLS label value of the node B. The MPLS label that identifies the BIER information is also referred to as a BIER label.

In this embodiment of this application, a bit position configured by the edge BFR is flooded in the BIER domain in advance by using an interior gateway protocol (IGP) or a border gateway protocol (BGP), so that each BFR in the BIER domain forms a bit index forwarding table (BIFT) for guiding forwarding of the original multicast data packet in the BIER domain. The information flooded in the BIER domain by using the IGP or the BGP may be referred to as BIER information. When receiving the BIER packet encapsulated with the BIER header, the BFR forwards the BIER packet to the destination node based on the BIFT entry.

In this embodiment of this application, the interior gateway protocol IGP may include but is not limited to an open shortest path first (OSPF) protocol, an intermediate system to intermediate system (ISIS) protocol, and the like.

It should be understood that the BIER domain means a network area in which BIER information can be flooded by using the IGP or BGP protocol and a BIFT entry can be created, and the BIER domain includes a BFIR and a BFER. The BIER information may include but is not limited to the BFR ID of each of the foregoing edge BFRs. In an example, if in an autonomous system (AS) domain, the IGP is deployed and the BIER information is flooded, the AS domain is a BIER domain.

In this embodiment of this application, there may be a plurality of types of BIER encapsulation. In an example, a BIER packet is encapsulated by using multiprotocol label switching (MPLS). Such encapsulation may be referred to as BIER-MPLS encapsulation. In another example, a BIER packet may be encapsulated based on the internet protocol version 6 (IPv6), and this encapsulation may be referred to as BIERv6 encapsulation.

It should be understood that BIERv6 encapsulation is a solution formed by combining advantages of the IPv6 and the BIER. A packet format under the BIERv6 encapsulation is: an IPv6 header+a BIER header+an original multicast data packet. The BIER header may be included in the IPv6 extension header. The IPv6 extension header including the BIER header is not specifically limited in this embodiment of this application. For example, the IPv6 extension header may be a destination option header (DOH). For another example, the IPv6 extension header may also be a routing header (HR).

It should be noted that, in the BIERv6 encapsulation, a format of the BIER header is not specifically limited in this embodiment of this application, provided that the BIER header includes the bit string field. The format of the BIER header may be a format shown in FIG. 2, or may be another format. For example, in another possible implementation, the BIER header directly includes the SD/BSL/SI fields but does not include the BIFT ID field in FIG. 2, and the BIFT ID field does not need to be mapped to values of SD/BSL/SI.

Specifically, in an example, refer to a type of possible BIERv6 encapsulation shown in FIG. 4. The BIER header may be located in the IPv6 extension header. Fields included in the IPv6 extension header are described in detail below.

Version number (Ver): The version number is a version number of IP, and a value 6 of the version number represents IPv6.

Traffic class (TC) field: The traffic class field identifies a priority of a packet.

Flow label (FL) field: A same flow label may be used to label a plurality of packets having same traffic, and another flow label value is used to label a plurality of packets having different traffic. During packet forwarding, different traffic may be shared on different links based on a flow label, and a plurality of packets having same traffic go through a same link.

Payload length (PL) field: The payload length field indicates a length of a packet.

Next header (NH) field: The next header field indicates a type of a next header of a packet, for example, may represent an IPv6 extension header.

Hop limit (HL) field: The hop limit field indicates limitation on a quantity of packets.

Source address (SA) field: The source address field identifies a source address of a packet.

Destination address (DA) field: The destination address field identifies a destination address of a packet.

The following uses the BIER domain shown in FIG. 3 as an example to describe a process of forwarding a packet encapsulated in BIERv6.

The node A is used as an ingress node of an IPv6 network. After receiving a user multicast data packet, the node A encapsulates the packet after the BIERv6 header. In other words, after the outer IPv6 header and the IPv6 extension header including the BIER header, the encapsulated BIERv6 packet is obtained. The BIER packet header included in the IPv6 extension header carries a bit string that represents a destination node set.

The node A sends the encapsulated BIERv6 packet to the node B based on the BIER header and bit string information of the BIER header. During the sending of the packet, a unicast address of the node B (for example, B::100) is used in a destination address field in the IPv6 header. The node B sends the packet to the node C and the node E based on the BIER header and the bit string information of the BIER header. During the sending, a unicast address of the node C (for example, C::100) and a unicast address of the node E (for example, E:100) are used in the destination address field in the IPv6 header. Similarly, the node C sends the packet to the node D and the node F based on the BIER packet header and bit string information of the BIER packet header. During the sending, the destination address field in the IPv6 header uses a unicast address of the node D (for example, D::100) and a unicast address of the node F (for example, D::100).

In a related technical solution, BIERv6 encapsulation may be applied to a multicast service, and the multicast service may support a plurality of VPNs. This scenario may also be referred to as a multicast VPN scenario. Specifically, a multicast source node in each VPN may allocate one IPv6 address to each VPN, and all nodes in the VPN need to store a correspondence between a source IPv6 address and a VPN. After receiving the BIERv6 packet, a multicast receiving node may determine, based on a source IPv6 address of the BIERv6 packet, which VPN the packet belongs to. In addition, after receiving the BIERv6 packet, the multicast receiving node may further determine, based on the source IPv6 address of the BIERv6 packet, which multicast source node the packet comes from, so as to perform a multicast reverse path forwarding (RPF) check.

In a multi-tenant intra-subnet service, a large quantity of tenants need to be supported. Therefore, in the multi-tenant intra-subnet service, if the foregoing related technical solutions are used, each node needs to store a correspondence between a source IPv6 address of each tenant and an identifier of a corresponding tenant, which not only causes a problem of large memory overheads, but also causes a problem of memory overhead waste.

Figure 5:
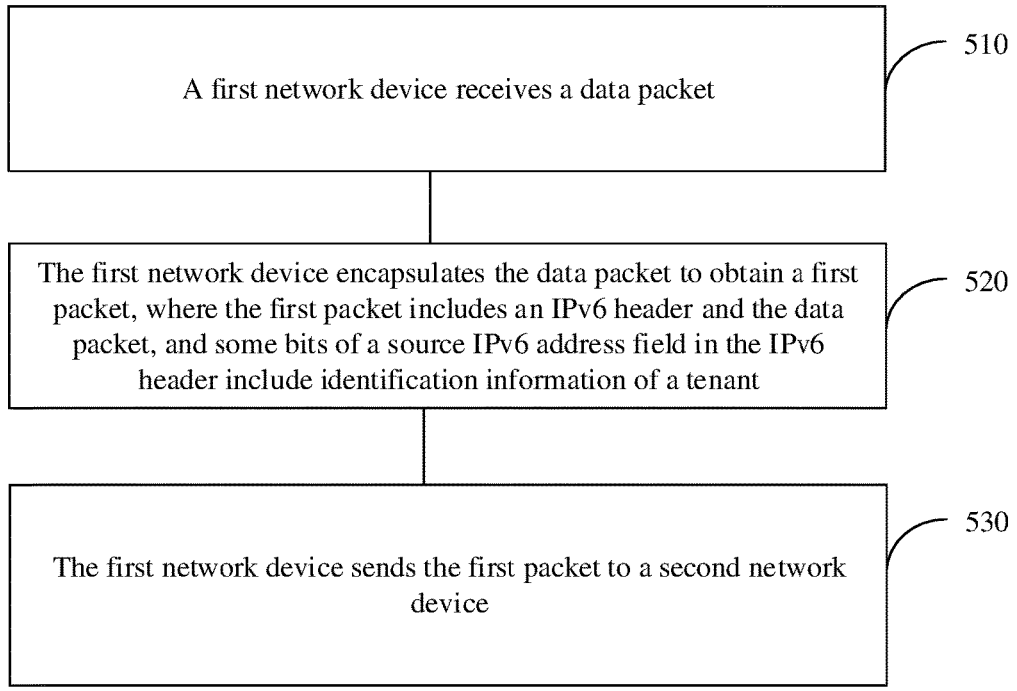
FIG. 5 is a schematic flowchart of a packet sending method according to an embodiment of this application.

In technical solutions provided in an embodiment of this application, when the BIERv6 packet is encapsulated and forwarded in the multi-tenant intra-subnet service, memory overheads can be reduced, and a problem such as memory overhead waste can be avoided. With reference to FIG. 5, the following describes in detail a packet sending method provided in this embodiment of this application.

FIG. 5 is a schematic flowchart of a packet sending method according to an embodiment of this application. Refer to FIG. 5. The method may include steps 510 to 530, and steps 510 to 530 are described in detail below.

Step 510: A first network device receives a data packet.

In this embodiment of this application, the first network device may be an edge BFR, for example, a BFIR for performing BIER encapsulation on a data packet in a BIER domain. As shown in FIG. 3, the first network device may correspond to the node A.

The received inner data packet is not specifically limited in this embodiment of this application, and may be a unicast data packet, may be a multicast data packet, or may be a broadcast packet.

Step 520: The first network device encapsulates the data packet to obtain a first packet, where the first packet includes an IPv6 header and the data packet, and some bits of a source IPv6 address field in the IPv6 header include identification information of a tenant.

Cloud computing means a network in which a cloud service provider provides resources. The network may include a large quantity of network devices. Users can obtain resources on "cloud" at any time and use them as required. In addition, the resources can be considered as infinitely expandable, provided that payment is made by usage. "Cloud" is like waterworks, and water can be taken by persons at any time, and is unlimited, provided that payment is made to waterworks based on their own water consumption.

A tenant means a customer that obtains and uses resources on network devices. Usually, one network device may have a plurality of interfaces, and one or more interfaces may correspond to one tenant. The tenant may lease the network device, or may lease one or more virtual machines on the network device. Different tenants need to be distinguished by tenant identification information.

It should be further understood that network devices or virtual machines belonging to one tenant may be in one network segment, or may not be in one network segment. This is not specifically limited in this application.

Specifically, in an implementation of this embodiment of this application, 24 bits of the source IPv6 address field are used to identify the identification information of the tenant.

In this embodiment of this application, after receiving the data packet, the first network device performs BIERv6 encapsulation on the data packet to obtain the first packet. The first packet includes the outer IPv6 header, the BIER header, and the inner data packet. It should be understood that the BIER header may be included in an IPv6 extension header, and the IPv6 extension header may be a destination option header (DOH). For another example, the IPv6 extension header may be a routing header (HR). This is not specifically limited in this application.

The first network device may further add, based on configuration information, the identification information of the tenant corresponding to the data packet into the source IPv6 address field in the IPv6 header. For specific fields included in the IPv6 header, refer to the description of FIG. 4. Details are not described herein again.

It should be understood that the identification information of the tenant is not specifically limited in this embodiment of this application. For example, a tenant or a VPN instance may be represented by using a 24-bit virtual network identifier (VNI). For another example, a tenant or a VPN instance may be represented by using a 20-bit MPLS label value.

It should be noted that, when the identification information of the tenant is represented by using a 20-bit MPLS label value, and a data packet of the tenant is encapsulated by using BIER, an encapsulation manner of one set of {BIER header+MPLS label+data packet} is used. The data packet may be, for example, broadcast, unknown unicast and multicast (BUM) traffic. The MPLS label is a global label. To be specific, a plurality of TOR devices use a same MPLS label to identify a same tenant. A value 1 of a proto field in the BIER header is used to indicate that the BIER header is followed by the MPLS label. This embodiment of this application may also be applicable to a case in which an MPLS global label is used. An MPLS global label representing a tenant is embedded in an IPv6 source address.

The 24-bit VNI is used as an example. The first network device may construct, based on both a locally configured 104-bit address block and the 24-bit VNI, a source IPv6 address whose length is 128 bits in the IPv6 header. Specifically, the 24-bit VNI may be embedded in any position in the 128-bit source IPv6 address field. This is not specifically limited in this application. For example, the 24-bit VNI may be embedded in the last 24 bits (the $105^{th}$ bit to the $128^{th}$ bit) of the 128-bit source IPv6 address field. For another example, the 24-bit VNI may be embedded in the $97^{th}$ bit to the $120^{th}$ bit of the 128-bit source IPv6 address field.

It should be noted that, in this embodiment of this application, all network devices in the BIER domain need to keep positions of VNIs embedded in source IPv6 address fields the same. In this way, only a BFER that is at an egress of the BIER domain and that decapsulates the BIER packet can obtain the VNI from the source IPv6 address field. There are a plurality of specific implementations. Positions of the 24-bit VNIs in the source IPv6 address fields can be kept the same by skipping configuring the position of the 24-bit VNI in the source IPv6 address field for each network device, or by using manual configuration.

Optionally, in some embodiments, the first network device may further indicate that the source IPv6 address field in the IPv6 header includes the identification information of the tenant. In a possible implementation, the first network device may use a value of a field in the BIER header of the IPv6 extension header to indicate that the identification information of the tenant is embedded in the source IPv6 address field in the IPv6 header. For example, the first network device sets a value of the proto field in the BIER header to a special value, and the special value is used to indicate that the identification information of the tenant is embedded in the source IPv6 address field in the IPv6 header. Specifically, refer to the format of the BIER header shown in FIG. 2. The proto field occupies 6 bits in total. The current RFC 8296 standard has defined values 1, 2, 3, 4, 5, and 6. In this embodiment of this application, the special value of the proto field may be a value different from these values. For another example, the first network device may further use a BIFT-id field in the BIER header to indicate that the identification information of the tenant is embedded in the source IPv6 address field in the IPv6 header. For another example, the first network device may further use a flag bit in the BIER header to indicate that the identification information of the tenant is embedded in some bits of the source IPv6 address field in the IPv6 header. Specifically, the some bits may be 24 bits of the source IPv6 address field. The 24 bits may be the last 24 bits of the source IPv6 address, namely, the $105^{th}$ bit to the $128^{th}$ from left to right. The 24 bits may alternatively be 24 bits of the middle of the source IPv6 address, for example, the $97^{th}$ bit to the $120^{th}$ bit from left to right.

Optionally, in some embodiments, before the first network device adds the identification information of the tenant into the source IPv6 address field in the IPv6 header, the method further includes: the first network device determines the identification information of the tenant to be embedded in the source IPv6 address field.

In an example, in a possible implementation, the first network device may determine the identification information of the tenant based on an interface for receiving the data packet. For example, the first network device receives the data packet from a 10GE1/0/2.1 interface, and determines, based on configuration information, that the 10GE1/0/2.1 interface is an interface of a first tenant. Therefore, the first network device embeds the identification information corresponding to the first tenant into the source IPv6 address field.

It should be understood that the first network device may store a correspondence between an interface on the first network device and a tenant. For example, the interface 10GE1/0/2.1 corresponds to the first tenant, and the first network device may determine, based on the correspondence between an interface and a tenant and based on that the interface for receiving the data packet is the 10GE1/0/2.1 interface, that the 10GE1/0/2.1 interface is the interface of the first tenant.

Step 530: The first network device sends the first packet to a second network device.

In this embodiment of this application, the second network device may be an edge BFR in the BIER domain, for example, a BFER that decapsulates a BIER packet in the BIER domain. A globally unique BFR ID is configured for each BFER. For example, the BFR ID may be a number ranging from 1 to 256. All BFR IDs in the BIER domain form a bit string. For details, refer to the foregoing description of the BIER technology. Details are not described herein again.

After receiving the first packet, the second network device may determine, based on a forwarding entry created on the second network device and the bit string in the BIER header of the first packet, that the first packet is sent to the second network device. After decapsulating the first packet, the second network device forwards the inner data packet.

In this embodiment of this application, before decapsulating the first packet, the second network device needs to obtain the identification information of the tenant from the source IPv6 address field in the outer IPv6 header. In addition, after the first packet is decapsulated, the inner data packet is sent based on the obtained identification information of the tenant to the interface corresponding to the tenant.

Specifically, in this embodiment of this application, the second network device may obtain the identification information of the first tenant included in some bits of the source IPv6 address field in the IPv6 header of the first packet, determine, based on the stored correspondence between an interface and a tenant, to perform sending to the interface of the first tenant, and send the inner data packet to the interface corresponding to the first tenant.

It should be understood that the interface, corresponding to the tenant, on the network device may belong to a layer 2 network, or may belong to a layer 3 network. This is not specifically limited in this embodiment of this application. In a scenario in which the interface, corresponding to the tenant, on the network device belongs to the layer 3 network, the tenant or the interface, corresponding to the tenant, on the network device may also be referred to as a bridge domain.

For ease of description, in the following embodiments, a bridge domain may be used to represent a tenant or an interface, corresponding to the tenant, on a network device.

Optionally, in some embodiments, before the second network device obtains the included identification information of the tenant from the source IPv6 address field in the outer IPv6 header, the method further includes: the second network device determines that the source IPv6 address field in the outer IPv6 header includes the identification information of the tenant. There are a plurality of implementations, and this is not specifically limited in this application. The following describes several possible implementations in detail.

In a possible implementation, the second network device indicates, based on a value of a field in the BIER header of the IPv6 extension header, that the identification information of the tenant is embedded in the source IPv6 address field in the IPv6 header. For example, the second network device determines, based on that the value of the proto field in the BIER header is a special value, that the source IPv6 address field in the outer IPv6 header includes the identification information of the tenant. For another example, the second network device determines, based on the BIFT-id field in the BIER header, that the source IPv6 address field includes the identification information of the tenant. Specifically, the second network device determines, based on the BIFT-id field in the BIER header, a sub-domain to which the packet belongs; and then determines, based on locally configured sub-domain information, that the source IPv6 address field includes the identification information of the tenant.

In another possible implementation, the second network device may alternatively determine, based on a local configuration, that the identification information of the tenant is embedded in the source IPv6 address field in the IPv6 header.

In the foregoing technical solutions, he identification information of the tenant VNI is embedded in the IPv6 source address of the BIER IPv6 packet, and in addition, it is indicated that "the VNI identification information of the tenant is embedded in the IPv6 source address". Therefore, when determining tenant information of the packet, a network device (for example, a TOR switch) receiving the packet needs only to read the IPv6 source address based on the indication information to obtain specific VNI information. The network device receiving the packet does not need to obtain corresponding tenant information based on the entire IPv6 source address, and does not need to store an N:1 mapping relationship between IPv6 addresses and VNIs, so as to reduce memory overheads, and avoid a problem such as memory overhead waste.

The following uses a network topology shown in FIG. 3 as an example to describe a specific implementation process of the packet sending method provided in this embodiment of this application. It should be understood that the following examples are merely intended to help a person skilled in the art understand this embodiment of this application, instead of limiting this embodiment of this application to a specific numerical value or a specific scenario shown in the examples. It is clear that a person skilled in the art can make various equivalent modifications or changes based on the examples, and such modifications and changes also fall within the scope of the embodiments of this application.

First, configuration information on a node is described.

```
bridge-domain 20 ##Intra-subnet 20 (using vni 5020)
   vni 5020
   evpn
      route-distinguisher 12:1
      vpn-target 2:2 export-extcommunity
      vpn-target 2:2 import-extcommunity

interface 10GE1/0/2.1 mode l2
   encapsulation dot1q vid 20
   bridge-domain 20

bridge-domain 30 ##Intra-subnet 30 (using vni 5030)
   vni 5030
   evpn
      route-distinguisher 13:1
      vpn-target 3:2 export-extcommunity
      vpn-target 3:2 import-extcommunity

interface 10GE1/0/2.2 mode l2
   encapsulation dot1q vid 30
   bridge-domain 30

interface LoopBack1 ##Configure a loopback interface, with different
loopback addresses for TOR devices.
   ipv6 enable
   ipv6 address 2001:A1::1 128

Bier
   Sub-domain 6 ipv6 ##Configure a sub-domain of BIER (using BIERv6
encapsulation).
      Bfr-prefix interface loopback1
      Encapsulation ipv6 bsl 256 max-si 4
   End-bier 2001:A1::AB37 ##Configure End.BIER for BIERv6. The End.BIER
varies with the TOR.
      Bfr-id 1
      Protocol isis

Ipv6-block blk1 2001:A2:3:4:5:6:: 104

interface Nve1
   source 2001:DB1:A::1 128 ##Unicast traffic sent to a local TOR uses a local
address as a destination address.
   vni 5020 head-end peer-list protocol bgp ##A peer of the tenant is obtained
by using the BGP.
   vni 5020 bum bier sub-domain 6 vni-embedded blk1 ##Described as below.
   vni 5020 unicast vni-embedded blk1 ##Described as below.
   vni 5030 head-end peer-list protocol bgp ##A peer of the tenant is obtained
by using the BGP.
   vni 5030 bum bier sub-domain 6 vni-embedded blk1 ##Described as below.
   vni 5030 unicast vni-embedded blk1 ##Described as below.

```

The following describes the foregoing configuration information in detail.

"bridge-domain 20" indicates a configured intra-subnet bridge domain 20 or an intra-subnet tenant 20. "bridge-domain 30" indicates an intra-subnet bridge domain 30 or an intra-subnet tenant 30.

"interface 10GE1/0/2.1 mode l2" indicates that the interface is added to the bridge domain 20. "interface 10GE1/0/2.2 mode l2" indicates that the interface is added to the bridge domain 30.

"vni 5020" indicates that identification information corresponding to the tenant 20 is vni 5020. "vni 5030" indicates that identification information corresponding to the tenant 30 is vni 5030.

"route-distinguisher 12:1" under "bridge-domain 20" indicates that a correspondence is established between nodes in the bridge domain 20 by using EVPN signaling. For example, the same route-distinguisher (12:1) and the same vpn-target (2:2) may be configured for the nodes in the "bridge-domain 20".

"route-distinguisher 13:1" under "bridge-domain 30" indicates that a correspondence is established between nodes in the bridge domain 30 by using EVPN signaling. For example, the same route-distinguisher (13:1) and the same vpn-target (3:2) may be configured for the nodes in the "bridge-domain 30".

"Bier" indicates configuration for BIER.

"sub-domain 6 ipv6" under "Bier" indicates that a BIER sub-domain 6 uses an IPv6 network.

"Bfr-prefix interface loopback1" indicates that a loopback1 address (namely, 2001:A1::1) is used as a BFR-prefix.

It should be understood that each BFR in the BIER domain needs to configure a BFR-prefix for each sub-domain. The BFR-prefix is an IP address of a BFR router, for which an IP address of a loopback interface is recommended. If a plurality of sub-domains are configured on the BFR, these sub-domains can use a same BFR prefix or different BFR prefixes.

"Encapsulation ipv6 bsl 256 max-si 4" indicates that IPv6 encapsulation is used for the sub-domain.

"End-bier 2001:A1::AB37" indicates that a configured IPv6 address used to indicate BIER forwarding is used as an End.BIER address.

It should be further understood that an IPv6 address used in a BIERv6 data packet is not a common IPv6 address, but a particular IPv6 address used for BIER packet processing, and is referred to as End.BIER. After the BFR router configures the End.BIER address, a forwarding entry with a 128-bit mask of the address is formed in a forwarding information base (FIB), and the forwarding entry indicates that the address is End.BIER. When receiving an IPv6 packet, the router searches the FIB by using a destination address. If a result of searching the FIB is an End.BIER address, the router performs an End.BIER-specific action, that is, continues to process the BIER header of the IPv6 extension packet header. Alternatively, if the destination address is a common IPv6 destination address, the result of searching the FIB indicates that the packet is an IPv6 packet that is sent to a current router and that includes a destination option extension packet header. In this case, the packet may be sent to a CPU for processing, and cannot be processed on a data plane.

End.BIER is used as a field value for BIERv6 data packet encapsulation, and is used together with information such as other field values required for BIERv6 data packet encapsulation, for example, a BIFT-id, a sub-domain of BIER, and a BFR-ID, as sub-information of BFR-prefix information for flooding through the IGP. Each router in an IGP domain creates a BIERv6 forwarding table based on the BFR-prefix, the BFR-ID, the BIFT-id, and the End.BIER address. Information about a neighbor in the BIERv6 forwarding table includes an End.BIER address corresponding to the neighbor.

The End.BIER is used only to indicate BIER packet processing, and BIER forwarding relies on the BIER packet header in the extension packet header, which includes: determining, based on the BIFT-id field in the BIER packet header, which <SD, BSL, SI> the packet belongs to, and then determining, based on the bit string of the BIER packet header, which SI and which BFER nodes of the SI the packet is sent to. If an IPv6 router not supporting BIER forwarding exists between a router A and a router B, the router needs only to forward the packet to the router B based on the IPv6 destination address in the packet.

"Bfr-id 1" indicates a BFR ID of a configured node.

"Protocol isis" indicates that BIER uses the IS-IS protocol for information flooding.

"Ipv6-block blk1 2001:A2:3:4:5:6:: 104" indicates that an address named blk1 is configured. Both the address of the blk1 and the identification information of the tenant form the source IPv6 address field encapsulated in the outer IPv6 header of the data packet. A 24-bit VNI is used as an example of the identification information of the tenant, and a mask of the address of the blk1 is 104 bits. A 20-bit VNI is used as an example of the identification information of the tenant, and a mask of the address of the blk1 is 108 bits.

"interface Nve1" indicates network virtualization edge (NVE) information of the configured node.

"source 2001:DB1:A::1 128" indicates that a local node NVE uses an address 2001:DB1:A::1 as a source address.

Unicast is used as an example. The first network device receives a unicast packet from a subinterface of the bridge domain 20 and needs to send the unicast packet to the second network device. In this case, the first network device encapsulates an outer IPv6 header and VNI information into the unicast packet. A source address of the outer IPv6 header is encapsulated by using a local address, and a destination address is a VNI address on a TOR 2.

"vni 5020 head-end peer-list protocol bgp" indicates that a bridge domain corresponding to vni 5020 uses the BGP protocol to discover nodes. For example, 10 nodes TOR 1 to TOR 10 in the bridge domain 20 may establish a BGP connection to a common BGP route reflector (RR). Each TOR sends its IP address to the RR and to another TOR through the RR, so that each TOR knows which nodes there are in the bridge domain 20.

"vni 5020 bum bier sub-domain 6 vni-embedded blk1" indicates that BIER encapsulation is used for a data packet of an intra-subnet tenant of vni 5020 for forwarding. The source IPv6 address field is constructed both by using the sub-domain 6 of the BIER and by using an address block of the blk1 and the identification information (for example, the VNI) of the tenant.

"vni 5020 unicast vni-embedded blk1" indicates that a manner of embedding the VNI into the IPv6 address is used for unicast traffic of an intra-subnet tenant of vni 5020.

For example, a local device constructs an IPv6 address (set as an address 1) based on the blk1 and a vni value that are locally configured, and generates a FIB corresponding to the address. The address in the FIB has indication information, indicating a VNI to which the address belongs. In this way, the local device receives a packet whose destination address is the address 1, and can learn, by searching the FIB table, which VNI the packet belongs to. In this mode, the BGP of vni 5020 further advertises a blk1 address block of the local device to other nodes in bridge domain 20. Other nodes in the bridge domain 20 also advertise their address blocks to the local device. When needing to send a unicast packet to a peer device, the local device constructs an address, as an outer IPv6 destination address, based on an address block of the peer device and a VNI value corresponding to the bridge domain 20.

Refer to FIG. 3. In an implementation of this application, the foregoing configuration may be performed for the node A.

The node A receives a data packet, for example, from the 10GE1/0/2.1 interface, and can determine, based on configuration information, that the 10GE1/0/2.1 interface is an interface of the tenant vni 5020. The node A further encapsulates the data packet based on the configuration information "vni 5020 bum bier sub-domain 6 vni-embedded blk1" and a BIER sub-domain 6 into an IPv6 header <including a source address SA and a destination address DA>, an IPv6 extension header <including a BIER header>, and a user data packet.

Specifically, in an example, the node A uses the first 104 bits of a configured blk1 address block+24 bits of the VNI to construct a source IPv6 address, so that a value of the VNI is embedded in some bits of the 128-bit source IPv6 address. For example, the 24-bit VNI is embedded in the last 24 bits (the $105^{th}$ bit to the $128^{th}$ bit) of the 128-bit source address. The node A further uses a proto field in the BIER header to indicate that the VNI is embedded in the source IPv6 address field in the IPv6 header.

It should be noted that, for encapsulation of the bit string and other fields in the BIER header, the node A determines, based on a peer-list of a tenant obtained by using the BGP and BIER information corresponding to each peer such as the BFR-id, a bit string to be encapsulated in the data packet. For a specific process in which the node A creates a BIER forwarding table, performs BIERv6 encapsulation, and forwards a BIER packet, refer to the description of FIG. 3. Details are not described herein.

That the node E in FIG. 3 receives a BIER packet sent by the node A is used as an example. After receiving the BIER packet, the node E determines, based on the bit string 1000, that the BIER packet is to be sent to a neighboring node E. The node E determines, based on an identifier * in the forwarding table, that the neighbor node E is the node E itself. Therefore, the node E, serving as a BFER at an egress of the BIER domain, can obtain the original data packet through decapsulation from the BIER packet, and forward the inner original data packet.

In this embodiment of this application, before obtaining the original data packet through decapsulation from the BIER packet, the node E can determine, based on the value of the proto field in the BIER header, that the source IPv6 address field in the outer IPv6 header includes the VNI. The node E reads the source IPv6 address field in the outer IPv6 header, and obtains the VNI value from the last 24 bits (the $105^{th}$ bit to the $128^{th}$ bit) of the 128-bit source address. Then, the node E decapsulates the BIERv6 packet (that is, strips the outer IPv6 header and the IPv6 extension header including the BIER header) to obtain the user data packet, and sends, based on the obtained VNI value, the user data packet to a bridge domain corresponding to the VNI.

The foregoing describes in detail the packet sending method provided in the embodiments of this application with reference to FIG. 1 to FIG. 5. The following describes in detail apparatus embodiments of this application with reference to FIG. 6 to FIG. 9. It should be understood that descriptions of the method embodiments correspond to descriptions of the apparatus embodiments. Therefore, for a part that is not described in detail, refer to the foregoing method embodiments.

Figure 6:
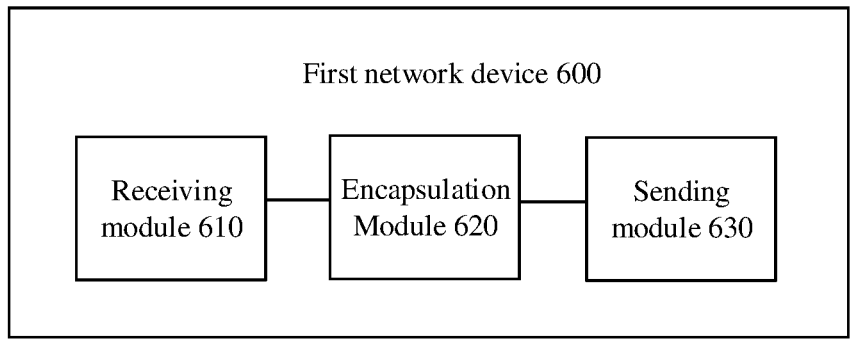
FIG. 6 is a schematic diagram of a structure of a first network device 600 according to an embodiment of this application.

FIG. 6 is a schematic diagram of a structure of a first network device 600 according to an embodiment of this application. The first network device 600 shown in FIG. 6 may perform corresponding steps performed by the first network device in the methods in the foregoing embodiments. As shown in FIG. 6, the first network device 600 includes a receiving module 610, an encapsulation module 620, and a sending module 630.

The receiving module 610 is configured to receive a data packet.

The encapsulation module 620 is configured to encapsulate the data packet to obtain a first packet, where the first packet includes an internet protocol version 6 IPv6 header, a bit index explicit replication BIER header, and the data packet, and some bits of a source IPv6 address field in the IPv6 header include identification information of a first tenant; and The sending module 630 is configured to send the first packet to a second network device, where the identification information of the first tenant is used by the second network device to determine to send the data packet to an interface, corresponding to the first tenant, of the second network device.

Optionally, the BIER header of the first packet includes a second identifier, and the second identifier is used to indicate that the first packet includes the identification information of the first tenant.

Optionally, a field used to identify the second identifier is a proto field or a bit index forwarding table identifier BIFT ID field.

Optionally, the first network device 600 further includes a determining module 640, configured to determine the identification information of the first tenant.

Optionally, the determining module 640 is specifically configured to: determine that an interface for receiving the data packet is an interface of the first tenant; and determine the identification information of the first tenant based on that the interface of the data packet is the interface of the first tenant.

Optionally, the identification information of the first tenant is a virtual network identifier VNI or a multiprotocol label switching MPLS label value.

Optionally, the data packet is a unicast packet, a multicast packet, or a broadcast packet.

Optionally, 24 bits of the source IPv6 address field are used to identify the identification information of the first tenant.

Figure 7:
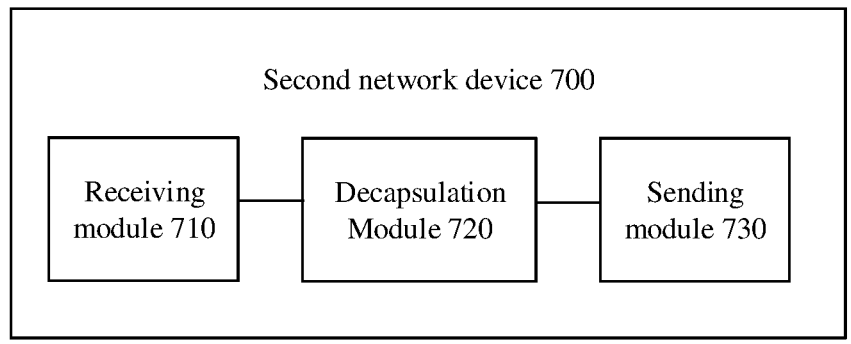
FIG. 7 is a schematic diagram of a structure of a second network device 700 according to an embodiment of this application.

FIG. 7 is a schematic diagram of a structure of a second network device 700 according to an embodiment of this application. The second network device 700 shown in FIG. 7 may perform corresponding steps performed by the second network device in the method in the foregoing embodiment. As shown in FIG. 7, the second network device 700 includes a receiving module 710, a decapsulation module 720, and a sending module 730.

The receiving module 710 is configured to receive a first packet sent by a first network device, where the first packet includes an internet protocol version 6 IPv6 header, a bit index explicit replication BIER header, and a data packet, and some bits of a source IPv6 address field in the IPv6 header include identification information of a first tenant.

The decapsulation module 720 is configured to decapsulate the first packet to obtain the data packet.

The sending module 730 is configured to send, based on the identification information of the first tenant, the data packet to an interface corresponding to the first tenant.

Optionally, the second network device 700 further includes a determining module 740, configured to determine, based on a second identifier included in the BIER header, that the first packet includes the identification information of the first tenant.

Optionally, a field used to identify the second identifier is a proto field or a bit index forwarding table identifier BIFT ID field.

Optionally, the identification information of the first tenant is a virtual network identifier VNI or a multiprotocol label switching MPLS label value.

Optionally, the data packet is a unicast packet, a multicast packet, or a broadcast packet.

Optionally, 24 bits of the source IPv6 address field are used to identify the identification information of the first tenant. To be specific, some bits of the source IPv6 address field include the identification information of the first tenant, and the some bits of the source IPv6 address field are 24 bits of the source IPv6 address field.

Figure 8:
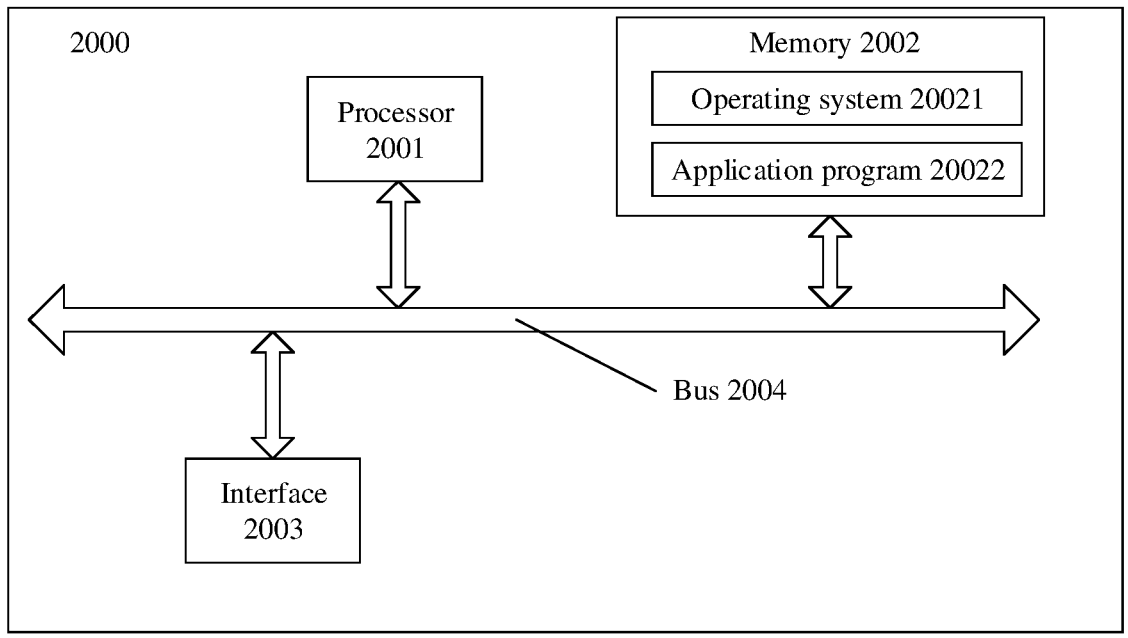
FIG. 8 is a schematic diagram of a hardware structure of a first network device 2000 according to an embodiment of this application.

FIG. 8 is a schematic diagram of a hardware structure of a first network device 2000 according to an embodiment of this application. The first network device 2000 shown in FIG. 8 may perform corresponding steps performed by the first network device in the methods in the foregoing embodiments.

As shown in FIG. 8, the first network device 2000 includes a processor 2001, a memory 2002, an interface 2003, and a bus 2004. The interface 2003 may be implemented in a wireless or wired manner, and may be specifically a network adapter. The processor 2001, the memory 2002, and the interface 2003 are connected through the bus 2004.

The interface 2003 may specifically include a transmitter and a receiver, and is used by the first network device to implement the foregoing receiving and sending. For example, the interface 2003 is configured to receive a data packet.

The processor 2001 is configured to perform processing performed by the first network device in the foregoing embodiments, for example, encapsulate the data packet to obtain a first packet; and/or perform other processes of technologies described in this specification. The memory 2002 includes an operating system 20021 and an application program 20022, and is configured to store a program, code, instructions. When executing the program, the code, or the instructions, a processor or a hardware device may complete a processing process of the first network device in the method embodiments. Optionally, the memory 2002 may include a read-only memory (ROM) and a random access memory (RAM). The ROM includes a basic input/output system (BIOS) or an embedded system, and the RAM includes an application program and an operating system. When the first network device 2000 needs to run, a bootloader in the BIOS or the embedded system that is firmed in the ROM is used to boot a system to start, and boot the first network device 2000 to enter a normal running state. After entering the normal running state, the first network device 2000 runs the application program and the operating system in the RAM, to complete the processing processes of the first network device 2000 in the method embodiments.

It may be understood that FIG. 8 shows only a simplified design of the first network device 2000. In actual application, the first network device may include any quantity of interfaces, processors, or memories.

Figure 9:
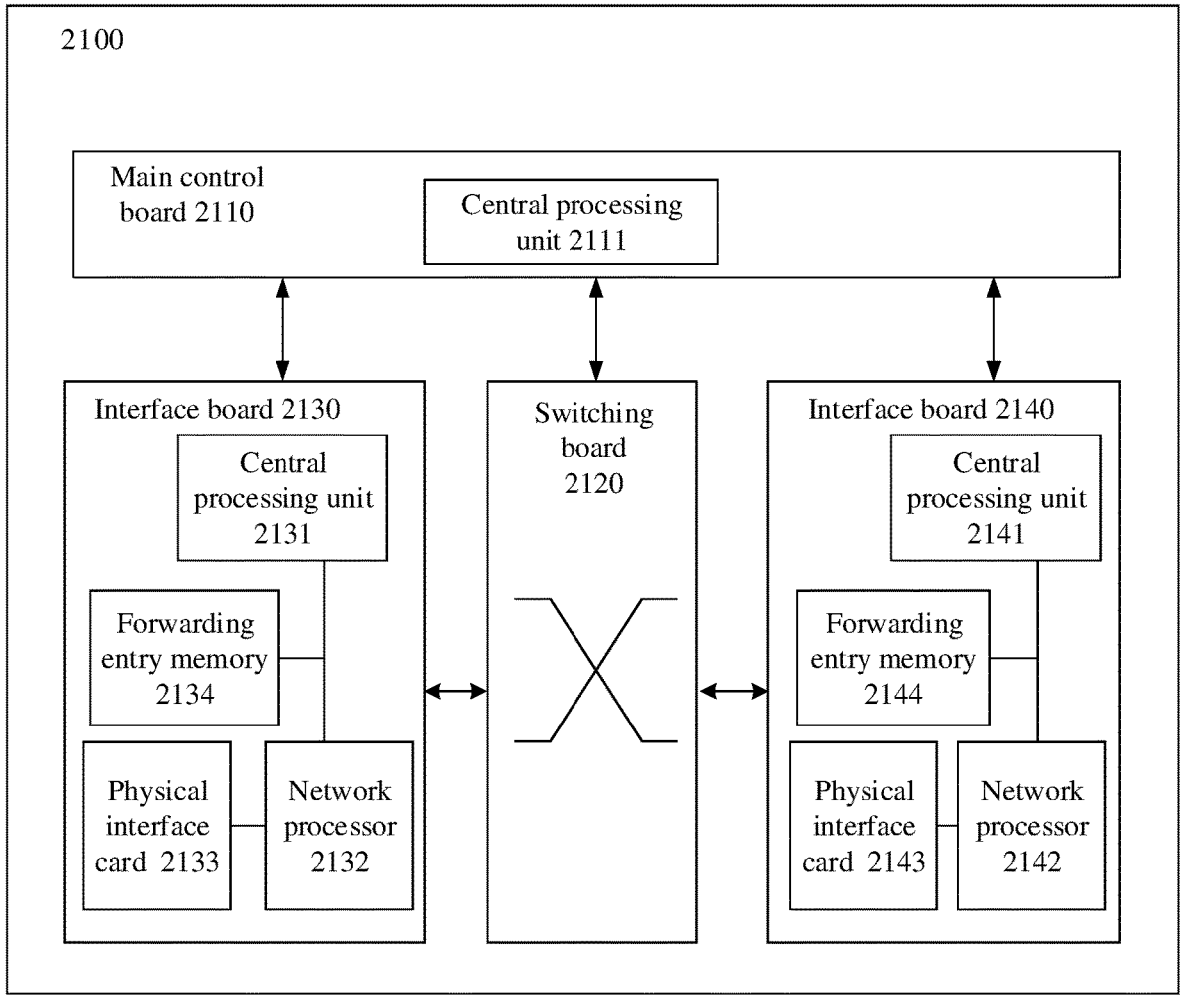
FIG. 9 is a schematic diagram of a hardware structure of another first network device 2100 according to an embodiment of this application.

FIG. 9 is a schematic diagram of a hardware structure of another first network device 2100 according to an embodiment of this application. The first network device 2100 shown in FIG. 9 may perform corresponding steps performed by the first network device in the method in the foregoing embodiment.

As shown in FIG. 9, the first network device 2100 includes a main control board 2110, an interface board 2130, a switching board 2120, and an interface board 2140. The main control board 2110, the interface boards 2130 and 2140, and the switching board 2120 are connected to a system backboard through a system bus for interworking. The main control board 2110 is configured to complete functions such as system management, device maintenance, and protocol processing. The switching board 2120 is configured to exchange data between interface boards (the interface board is also referred to as a line card or a service board). The interface boards 2130 and 2140 are configured to provide various service interfaces (for example, a POS interface, a GE interface, and an ATM interface), and forward a data packet.

The interface board 2130 may include a central processing unit 2131, a forwarding entry memory 2134, a physical interface card 2133, and a network processor 2132. The central processing unit 2131 is configured to control and manage the interface board, and communicate with a central processing unit on the main control board. The forwarding entry memory 2134 is configured to store an entry, for example, the foregoing BIFT. The physical interface card 2133 is configured to receive and send traffic.

It should be understood that an operation on the interface board 2140 is consistent with an operation on the interface board 2130 in this embodiment of this application. For brevity, details are not described again. It should be understood that the first network device 2100 in this embodiment may correspond to the functions and/or the various implemented steps in the method embodiments. Details are not described herein again.

In addition, it should be noted that there may be one or more main control boards, and when there are a plurality of main control boards, the main control boards may include an active main control board and a standby main control board. There may be one or more interface boards. The first network device having a stronger data processing capability provides more interface boards. There may also be one or more physical interface cards on the interface board. There may be no switching board, or there may be one or more switching boards. When there are a plurality of switching boards, load sharing and redundancy backup may be implemented together. In a centralized forwarding architecture, the first network device may not need the switching board, and the interface board provides a function of processing service data of an entire system. In a distributed forwarding architecture, the first network device may have at least one switching board, and data exchange between a plurality of interface boards is implemented by using the switching board, to provide a large-capacity data exchange and processing capability. Therefore, a data access and processing capability of the first network device in the distributed architecture is better than that of the device in the centralized architecture. A specific architecture that is to be used depends on a specific networking deployment scenario. This is not limited herein.

Figure 10:
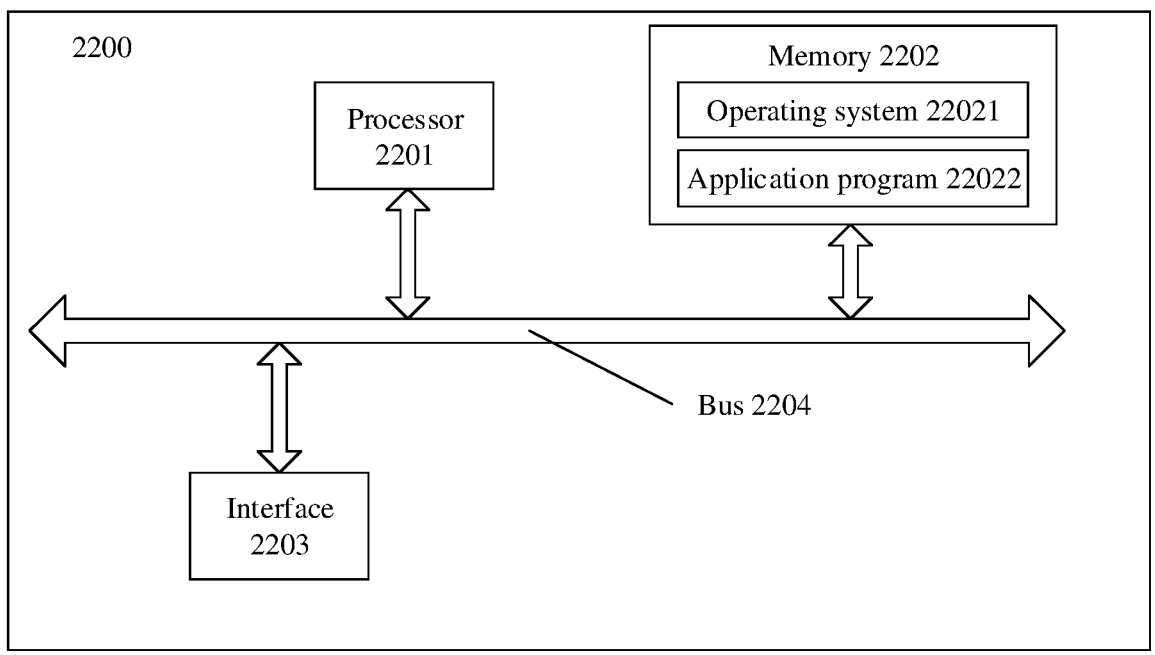
FIG. 10 is a schematic diagram of a hardware structure of a second network device 2200 according to an embodiment of this application.

FIG. 10 is a schematic diagram of a hardware structure of a second network device 2200 according to an embodiment of this application. The second network device 2200 shown in FIG. 10 may perform corresponding steps performed by the second network device in the method in the foregoing embodiment.

As shown in FIG. 10, the second network device 2200 includes a processor 2201, a memory 2202, an interface 2203, and a bus 2204. The interface 2203 may be implemented in a wireless or wired manner, and may be specifically a network adapter. The processor 2201, the memory 2202, and the interface 2203 are connected through the bus 2204.

The interface 2203 may specifically include a transmitter and a receiver, and is used by the second network device to implement the foregoing receiving and sending. For example, the interface 2203 is configured to receive the first packet sent by the first network device. For another example, the interface 2203 is configured to support sending of a data packet, based on identification information of a first tenant, to an interface corresponding to the first tenant. For example, the data packet may be sent to a bridge domain of the first tenant.

The processor 2201 is configured to perform processing performed by the second network device in the foregoing embodiments. For example, the processor 2201 is configured to obtain the identification information of the first tenant from a source IPv6 address field, and is configured to decapsulate the first packet to obtain the data packet, and/or perform other processes of technologies described in this specification. The memory 2202 includes an operating system 22021 and an application program 22022, and is configured to store a program, code, or instructions. When executing the program, the code, or the instructions, the processor or a hardware device may complete a processing process of the second network device in the method embodiments. Optionally, the memory 2202 may include a read-only memory (ROM) and a random access memory (RAM). The ROM includes a basic input/output system (BIOS) or an embedded system, and the RAM includes an application program and an operating system. When the second network device 2200 needs to run, a bootloader in the BIOS or the embedded system that is firmed in the ROM is used to boot a system to start, and boot the second network device 2200 to enter a normal running state. After entering the normal running state, the second network device 2200 runs the application program and the operating system in the RAM, to complete the processing process of the second network device in the method embodiments.

It may be understood that FIG. 10 shows merely a simplified design of the second network device 2200. In actual application, the second network device may include any quantity of interfaces, processors, or memories.

Figure 11:
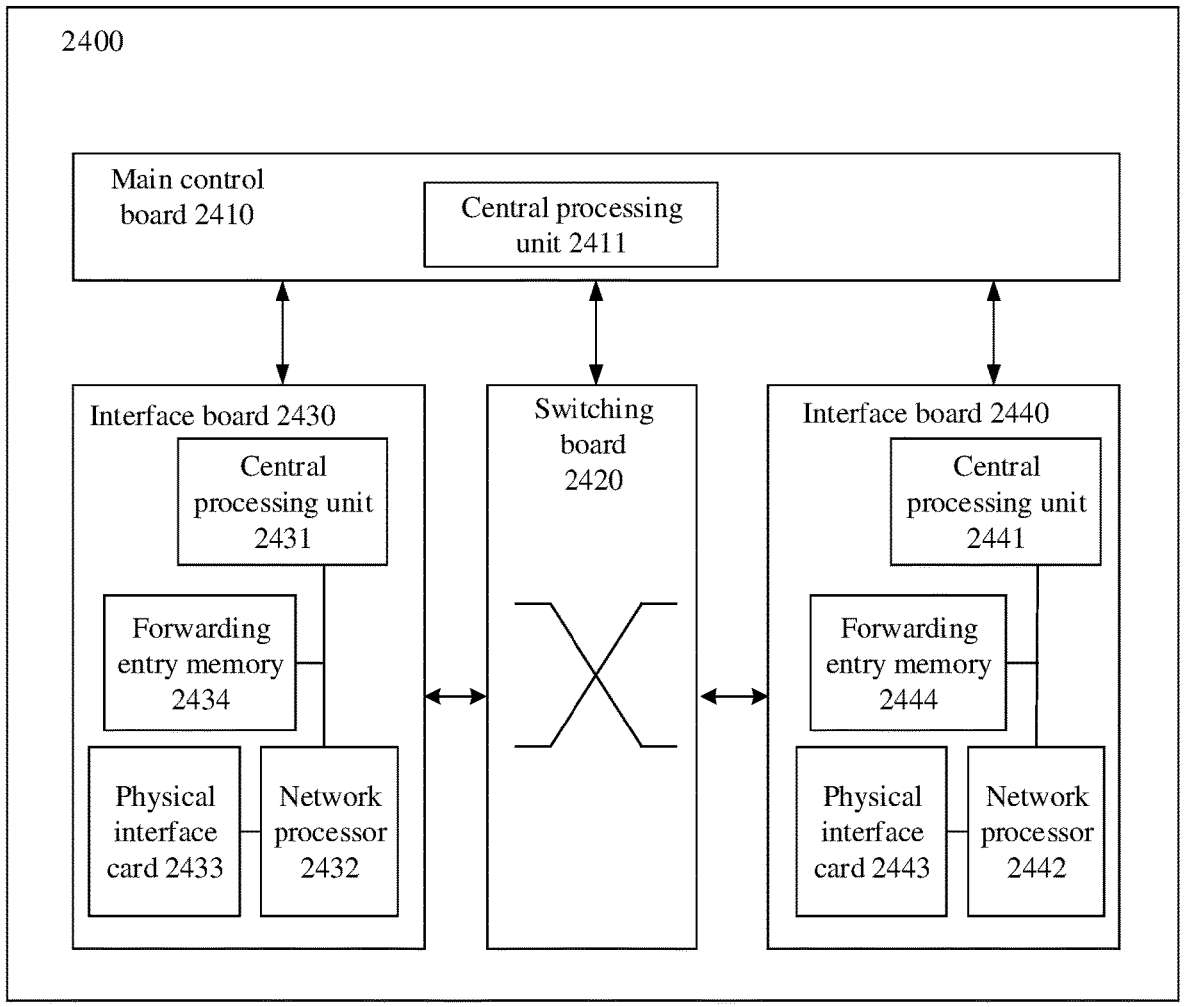
FIG. 11 is a schematic diagram of a hardware structure of another second network device 2400 according to an embodiment of this application.

FIG. 11 is a schematic diagram of a hardware structure of another second network device 2400 according to an embodiment of this application. The second network device 2400 shown in FIG. 11 may perform corresponding steps performed by the second network device in the method in the foregoing embodiment.

As shown in FIG. 11, the second network device 2400 includes a main control board 2410, an interface board 2430, a switching board 2420, and an interface board 2440. The main control board 2410, the interface boards 2430 and 2440, and the switching board 2420 are connected to a system backplane through a system bus. The main control board 2410 is configured to complete functions such as system management, device maintenance, and protocol processing. The switching board 2420 is configured to complete data exchange between interface boards (the interface board is also referred to as a line card or a service board). The interface boards 2430 and 2440 are configured to provide various service interfaces (such as a POS interface, a GE interface, and an ATM interface) and implements packet forwarding.

The interface board 2430 may include a central processing unit 2431, a forwarding entry memory 2434, a physical interface card 2433, and a network processor 2432. The central processing unit 2431 is configured to control and manage the interface board, and communicate with a central processing unit on the main control board. The forwarding entry memory 2434 is configured to store an entry, for example, the foregoing BIFT. The physical interface card 2433 is configured to receive and send traffic.

It should be understood that, in this embodiment of this application, an operation on the interface board 2440 is the same as an operation on the interface board 2430. For brevity, details are not described again. It should be understood that the second network device 2400 in this embodiment may correspond to the functions and/or the various implemented steps in the foregoing method embodiments. Details are not described herein again.

In addition, it should be noted that there may be one or more main control boards, and when there are a plurality of main control boards, the main control boards may include an active main control board and a standby main control board. There may be one or more interface boards. A second network device having a stronger data processing capability provides more interface boards. There may also be one or more physical interface cards on the interface board. There may be no switching board, or there may be one or more switching boards. When there are a plurality of switching boards, load sharing and redundancy backup may be implemented together. In a centralized forwarding architecture, the second network device may not need the switching board, and the interface board provides a function of processing service data of an entire system. In a distributed forwarding architecture, the second network device may have at least one switching board, and data exchange between a plurality of interface boards is implemented by using the switching board, to provide a large-capacity data exchange and processing capability. Therefore, a data access and processing capability of the second network device in the distributed architecture is better than that of the device in the centralized architecture. A specific architecture that is to be used depends on a specific networking deployment scenario. This is not limited herein.

An embodiment of this application further provides a computer-readable medium. The computer-readable medium stores program code. When the computer program code is run on a computer, the computer is enabled to perform the method according to any one of the foregoing aspects. The computer-readable storage includes but is not limited to one or more of the following: a read-only memory (ROM), a programmable ROM (PROM), an erasable PROM (EPROM), a flash memory, an electrically EPROM (EEPROM), and a hard drive.

An embodiment of this application further provides a chip system applied to a first network device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the first network device in the methods in the foregoing aspects.

In a specific implementation process, the chip may be implemented in a form of a central processing unit (CPU), a micro controller (MCU), a microprocessing unit (MPU), a digital signal processor (DSP), a system-on-a-chip (SoC), an application-specific integrated circuit (ASIC), a field programmable gate array (FPGA), or a programmable logic device (PLD).

An embodiment of this application further provides another chip system applied to a second network device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the second network device in the methods in the foregoing aspects.

In a specific implementation process, the chip may be implemented in a form of a central processing unit (CPU), a micro controller (MCU), a microprocessing unit (MPU), a digital signal processor (DSP), a system-on-a-chip (SoC), an application-specific integrated circuit (ASIC), a field programmable gate array (FPGA), or a programmable logic device (PLD).

An embodiment of this application further provides a computer program product, applied to a first network device. The computer program product includes a series of instructions, and when the instructions are run, operations of the first network device in the method embodiment in the foregoing aspects are performed.

An embodiment of this application further provides a computer program product, applied to a second network device. The computer program product includes a series of instructions, and when the instructions are run, operations of the second network device in the method embodiment in the foregoing aspects are performed.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other similar forms.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   receiving, by a first network device, a data packet, and encapsulating, by the first network device, the data packet to obtain a first packet, wherein the first packet comprises an internet protocol version 6 (IPv6) header, a bit index explicit replication (BIER) header and the data packet, and a number of bits of a source IPv6 address field in the IPv6 header indicate identification information of a first tenant of the data packet; and
   sending, by the first network device, the first packet to a second network device, wherein the identification information of the first tenant indicates a first interface to which the data packet is to be sent by the second network device, the first interface corresponding to the first tenant.

2. The method according to claim 1, wherein the number of bits of the source IPv6 address field comprise 24 bits used to indicate identification information of the first tenant.

3. The method according to claim 1, wherein the BIER header of the first packet comprises a second identifier, and the second identifier indicates that the first packet comprises the identification information of the first tenant.

4. The method according to claim 3, wherein the second identifier is indicated using a field in the BIER header, and the field is a proto field or a bit index forwarding table identifier (BIFT ID) field.

5. The method according to claim 1, wherein before encapsulating, by the first network device, the data packet to obtain the first packet, the method further comprises:
   determining, by the first network device, that an interface used to receive the data packet by the first network device is an interface of the first tenant; and
   determining, by the first network device, the identification information of the first tenant based on the interface of the first tenant.

6. A method, comprising:
   receiving, by a second network device, a first packet, wherein the first packet comprises an internet protocol version 6 (IPv6) header, a bit index explicit replication (BIER) header and a data packet, and a number of bits of a source IPv6 address field in the IPv6 header indicate identification information of a first tenant of the first packet;
   decapsulating, by the second network device, the first packet to obtain the data packet; and
   sending, by the second network device based on the identification information of the first tenant, the data packet to an interface corresponding to the first tenant.

7. The method according to claim 6, wherein the number of bits of the source IPv6 address field comprise 24 bits used to identify the identification information of the first tenant.

8. The method according to claim 6, wherein before sending, by the second network device based on the identification information of the first tenant, the data packet to the interface corresponding to the first tenant, the method further comprises:
determining, by the second network device based on a second identifier comprised in the BIER header, that the first packet comprises the identification information of the first tenant.

9. The method according to claim 8, wherein the second identifier is indicated using a field in the BIER header, and the field is a proto field or a bit index forwarding table identifier (BIFT ID) field.

10. A first network device, comprising:
a processor and a non-transitory memory, wherein the memory is configured to store a program, and the processor is configured to invoke the program from the memory and run the program to:
receive a data packet;
encapsulate the data packet to obtain a first packet, wherein the first packet comprises an internet protocol version 6 (IPv6) header, a bit index explicit replication (BIER) header and the data packet, and a number of bits of a source IPv6 address field in the IPv6 header indicates identification information of a first tenant of the data packet; and
send the first packet to a second network device, wherein the identification information of the first tenant indicates a first interface to which the data packet is to be sent by the second network device, the first interface corresponding to the first tenant.

11. The first network device according to claim 10, wherein the number of bits of the source IPv6 address field comprise 24 bits used to indicate the identification information of the first tenant.

12. The first network device according to claim 10, wherein the BIER header of the first packet comprises a second identifier, and the second identifier indicates that the first packet comprises the identification information of the first tenant.

13. The first network device according to claim 12, wherein the second identifier is indicated using a field in the BIER header, and the field is a proto field or a bit index forwarding table identifier (BIFT ID) field.

14. The first network device according to claim 10, wherein the processor is further configured to invoke the program from the memory and run the program to:
determine that an interface used to receive the data packet by the first network device is an interface of the first tenant; and
determine the identification information of the first tenant based on the interface of the data packet.

15. The first network device according to claim 10, wherein the identification information of the first tenant is a virtual network identifier (VNI) or a multiprotocol label switching (MPLS) label value.

16. A second network device, comprising:
a processor and a non-transitory memory, wherein the memory is configured to store a program, and the processor is configured to invoke the program from the memory and run the program to:
receive a first packet, wherein the first packet comprises an internet protocol version 6 (IPv6) header, a bit index explicit replication (BIER) header and a data packet, and a number of bits of a source IPv6 address field in the IPv6 header indicate identification information of a first tenant;
decapsulate the first packet to obtain the data packet; and
send, based on the identification information of the first tenant, the data packet to an interface corresponding to the first tenant.

17. The second network device according to claim 16, wherein the number of bits of the source IPv6 address field comprise 24 bits used to identify the identification information of the first tenant.

18. The second network device according to claim 16, wherein the processor is further configured to invoke the program from the memory and run the program to:
determine, based on a second identifier comprised in the BIER header, that the first packet comprises the identification information of the first tenant.

19. The second network device according to claim 18, wherein the second identifier is indicated using a field in the BIER header, and the field is a proto field or a bit index forwarding table identifier (BIFT ID) field.

20. The second network device according to claim 16, wherein the identification information of the first tenant is a virtual network identifier (VNI) or a multiprotocol label switching (MPLS) label value.

* * * * *

UNITED STATES PATENT AND TRADEMARK OFFICE
CERTIFICATE OF CORRECTION

PATENT NO. : 12,170,618 B2
APPLICATION NO. : 17/849113
DATED : December 17, 2024
INVENTOR(S) : Xie et al.

Page 1 of 1

It is certified that error appears in the above-identified patent and that said Letters Patent is hereby corrected as shown below:

In the Specification

In Column 11, Line 23, delete "1000;" and insert -- 0100; --.

In Column 13, Line 57, delete "1000." and insert -- 0100. --.

In Column 14, Line 58, delete "1000," and insert -- 0100, --.

In Column 25, Line 9, delete "1000," and insert -- 0100, --.

Signed and Sealed this
Eleventh Day of February, 2025

Coke Morgan Stewart
*Acting Director of the United States Patent and Trademark Office*